US012523262B2

(12) United States Patent
Stöckner et al.

(10) Patent No.: US 12,523,262 B2
(45) Date of Patent: Jan. 13, 2026

(54) SWITCHABLE CLUTCH UNIT

(71) Applicant: MCLAREN ENGINEERING CRIMMITSCHAU TECH CENTER GMBH, Crimmitschau (DE)

(72) Inventors: Bastian Stöckner, Zwickau-Pölbitz (DE); Robert Schuster, Zwickau-Pölbitz (DE); Josia Buchert, Chemnitz Altchemnitz (DE); Evan Swinger, Farmington Hills, MI (US)

(73) Assignee: MCLAREN ENGINEERING CRIMMITSCHAU TECH CENTER GMBH, Crimmitschau (DE)

( * ) Notice: Subject to any disclaimer, the term of this patent is extended or adjusted under 35 U.S.C. 154(b) by 58 days.

(21) Appl. No.: 18/720,372

(22) PCT Filed: Dec. 14, 2022

(86) PCT No.: PCT/US2022/052852
§ 371 (c)(1),
(2) Date: Jun. 14, 2024

(87) PCT Pub. No.: WO2023/114305
PCT Pub. Date: Jun. 22, 2023

(65) Prior Publication Data
US 2024/0418226 A1 Dec. 19, 2024

(30) Foreign Application Priority Data
Dec. 14, 2021 (DE) .......................... 102021132955.8

(51) Int. Cl.
*F16D 11/14* (2006.01)

(52) U.S. Cl.
CPC .................................... *F16D 11/14* (2013.01)

(58) Field of Classification Search
CPC ... F16D 11/14; F16D 2011/004; B60K 17/02; B60K 17/354; B60K 17/356; B60K 6/448; B60K 6/387; B60K 2001/001
See application file for complete search history.

(56) References Cited

U.S. PATENT DOCUMENTS

| 1,907,619 A | 5/1933 | Soden-Fraunhofen |
| 2013/0240317 A1 | 9/2013 | Mori et al. |
| 2013/0240318 A1* | 9/2013 | Mori ....................... F16D 11/10 192/69.9 |

(Continued)

*Primary Examiner* — Farhana Pervin
(74) *Attorney, Agent, or Firm* — Miller Canfield

(57) ABSTRACT

A switchable clutch unit for coupling a drive component, wherein the clutch unit comprises: a primary side and a secondary side, which can be positively connected to one another for rotary driving, wherein the secondary side has driving recesses distributed around the circumference, wherein the primary side has driving claws distributed around the circumference, which are formed for engaging in the driving recesses of the secondary side, wherein the driving claws comprise a group of first driving claws and a group of second driving claws, wherein the first driving claws can be moved between an engaged position and an disengaged position with respect to the driving recesses, wherein the second driving claws are displaceable between an engaged position and an disengaged position with respect to the driving recesses, and wherein the first driving claws and the second driving claws are displaceable relative to one another.

23 Claims, 10 Drawing Sheets

(56) References Cited

U.S. PATENT DOCUMENTS

| | | | |
|---|---|---|---|
| 2014/0283637 A1* | 9/2014 | Iwasaki | F16D 11/10 |
| | | | 74/335 |
| 2016/0053822 A1 | 2/2016 | Nefacy et al. | |
| 2017/0045099 A1* | 2/2017 | Peet | F16D 47/04 |
| 2017/0051811 A1* | 2/2017 | Takeuchi | F16D 21/04 |
| 2018/0119750 A1* | 5/2018 | Yoshimura | F16D 11/10 |
| 2018/0216676 A1* | 8/2018 | Geiser | F16D 41/088 |
| 2018/0347678 A1 | 12/2018 | Kim et al. | |
| 2019/0242442 A1* | 8/2019 | Shiotsu | F16H 63/30 |
| 2019/0351751 A1 | 11/2019 | Sato et al. | |
| 2020/0025261 A1* | 1/2020 | Lee | F16D 13/16 |
| 2020/0063860 A1* | 2/2020 | Lee | F16H 61/14 |
| 2022/0136594 A1* | 5/2022 | Holmes | F16D 47/04 |
| | | | 192/69.42 |
| 2022/0397164 A1* | 12/2022 | Geiser | F16D 41/12 |

\* cited by examiner

SWITCHABLE CLUTCH UNIT

BACKGROUND OF THE INVENTION

1. Field of the Invention

The present disclosure relates to a switchable clutch unit for coupling a drive component, in particular a drive component of a vehicle driven by an electric motor or provided with a drive assisted by an electric motor.

2. Description of the Related Art

DE 10 2004 020 863 A1 discloses a claw clutch comprising a primary part and a secondary part, each of which are provided with claws with inclined flanks, wherein the primary part being axially displaceable is mounted on a primary shaft part and lockable in an engaged position, wherein a ring-shaped intermediate part is arranged between the primary part and the secondary part, which has counter-claws in the direction of the primary part as well as in the direction of the secondary part, wherein the intermediate part is axially fixed, wherein in an engagement position the primary part, the secondary part and the intermediate part can be connected to each other torsionally when the primary part is in the engaged position, and wherein in the engaged position there is circumferential play between the primary part, the secondary part and the intermediate part, so that engagement and disengagement is also possible with undercut claws or counter-claws between the secondary part and intermediate part.

Claw clutches are capable of positive rotary entrainment and torque transmission. Claw clutches regularly have a primary part and a secondary part, which are essentially concentrically aligned to each other, and whose end faces facing one another have matched claws that can engage in one another. In the engaged state, slip-free rotary drive is possible. In the disengaged state, the primary part and the secondary part can be rotated essentially independently of each other. The claws are designed, for example, as teeth or similar elevations, which alternate with gaps or similar depressions. The claws facing each other on the primary part and the secondary part may be similar or even identical, but this is not a necessary requirement.

Claw clutches of conventional design require a certain rotation orientation between the primary part and the secondary part for the shift process (opening and closing of the clutch). In this way, it is avoided that the claws (elevations) collide on the front side and are not offset in such a way that claws of the primary part and claws of the secondary part can interlock. For this reason, switching operations at significantly different rotational speeds (speeds) between the primary part and the secondary part are sometimes associated with difficulties.

In connection with electric mobility and the desire for constant reduction in carbon dioxide emissions from conventional drives, it is worth considering coupling or decoupling vehicle drive components as required. In this way, friction losses in the drive are minimized. Similar challenges exist with complex systems, such as engageable all-wheel drives or vehicles with hybrid drive. There are hybrid vehicles known which, in addition to a conventional combustion engine, can drive at least one vehicle axle directly and have at least one electrically motor-driven vehicle axle. In this way, various operating modes (for example, purely internal combustion engine, purely electric motor, combined combustion engine and electric motor, four-wheel drive by two electrically driven axles) are conceivable.

Clutches are also provided in connection with so-called gliding in order to decouple a conventional combustion engine from the powertrain as required. However, there are also operating states in which drive components are deliberately coupled, for example in a recuperation mode to recover electrical energy while driving.

With modern vehicle concepts, there are therefore various conceivable reasons for a deliberate coupling or decoupling of drive components.

Against this background, the object underlying the disclosure is to specify a shiftable clutch unit that enables smooth, fast and reliable shifting operations. The clutch unit should be able to contribute to reducing fuel consumption and carbon dioxide emissions during operation. Furthermore, the clutch unit should be flexible in order to enable different driving modes with electric motor, internal combustion engine or hybrid drive in vehicles. Preferably, the clutch unit allows shifting operations even when the speeds of the involved clutch sides differ from one another. Preferably, the clutch unit allows simple and robust actuation. Preferably, the probability of incorrect actuations can be reduced during operation of the clutch unit. Preferably, the clutch unit can be switched and controlled with little operating effort and monitoring effort.

SUMMARY OF THE INVENTION

According to a first aspect, the present disclosure relates to a switchable clutch unit for coupling a drive component, in particular a drive component of an electric motor-driven vehicle or a vehicle equipped with an electric motor-assisted drive, wherein the clutch unit has the following:
- a primary side and a secondary side, which can be connected to each other in a form-fitting manner for rotary driving,
- wherein the secondary side has driving recesses distributed around the circumference,
- wherein the primary side has driving claws distributed around the circumference, which are designed to engage in the driving recesses of the secondary side,
- wherein the driving claws comprise a group of first driving claws and a group of second driving claws,
- wherein the first driving claws are displaceable between an engaged position and a disengaged position with respect to the driving recesses,
- wherein the second driving claws are displaceable between an engaged position and a disengaged position with respect to the driving recesses, and
- wherein the first driving claws and the second driving claws are being displaceable relative to one another.

The object of the disclosure is achieved in this way.

A drive component may be, for example, an axle, a drive shaft, a drive motor (electric motor, internal combustion engine or the like), a transmission (for example, a manual transmission or an automatic transmission), a differential, a cardan shaft, an alternator, a generator, another auxiliary unit (for example, air conditioning compressor) or similar. In at least one operating state, the drive component can be driven by a drive motor (electric motor, internal combustion engine or the like).

In the context of the present disclosure, primarily designs are described in which the primary side serves as the drive side and the secondary side as the output side. However, this is not to be understood as restrictive. A reverse assignment is also conceivable. Embodiments are also conceivable in which, depending on the specific operating state, the primary side is temporarily the drive side at times and the secondary side is temporarily the drive side at times. The terms primary side and secondary side are primarily for distinguishing purposes and are not intended to define qualitative or quantitative order. The same applies to other ordinal numbers and comparable terms (first, second, etc.) used in the context of this disclosure to describe embodiments. The terms primary side and secondary side do not necessarily refer to a geometric division of the clutch unit into two mutually definable areas (for example, right side, left side). Instead, the terms primary side and secondary side refer to a functional delimitation of components involved. At least in the open state, primary side components and secondary side components can rotate relative to each other.

The driving claws of the primary side can move into the driving recesses of the secondary side. In an exemplary embodiment, this can be done in such way that driving claws designed as teeth or elevations on the primary side engage in driving recesses designed as tooth gaps or depressions on the secondary side. This therefore refers to an exemplary embodiment in which both the primary side and the secondary side are each provided with claws (teeth, elevations), which alternate with recesses (tooth gaps, depressions).

The driving claws and the driving recesses allow a form-fitting, at least one essentially form-fitting rotary engagement and torque transmission between the primary side and the secondary side.

The first driving claws are used, for example, to synchronize the movements of the primary side and the secondary side. The second driving claws are used, for example, to transfer movement. This is not to be understood as restrictive. Again, the first and second ordinals are primarily used to differentiate and not for qualitative or quantitative weighting.

Since the first driving claws and the second driving claws can be displaced relative to each other, it is conceivable that during a switching operation initially only the first driving claws are moved in order to engage in associated driving recesses on the secondary side. This allows, for example, a design in which the driving recesses (in the sense of a rotation angle) are wider than the first driving claws that engage in them. This makes it easier to "find" and then align the primary and secondary sides. After the first driving claws have engaged, a favorable relative orientation between can result between the primary side and the secondary side, which enables the second driving claws to be engaged or advanced easily.

A switching operation (coupling) is carried out, for example, in such a way that the first driving claws move into a wider gap (driving recess) when the clutch unit is actuated. In the case of a relative rotation (difference in speed) between the primary side and the secondary side, the first driving claws then move within the gap. This usually takes place within defined limits up to a stop. This movement ensures that the second driving claws also face a free gap (driving recess) and can move into it. This free gap may be the same driving recess or a different driving recess.

It is conceivable to provide for one and the same driving recess for a first driving claw and a second driving claw. It is also conceivable to provide for first driving recesses and second driving recesses, each adapted to the first driving claws and the second driving claws, respectively. Within a group, the driving claws are designed similarly or identically, at least in exemplary embodiments.

The activation movement of the first driving claws and the second driving claws is a functionally coupled movement, but not a mechanically (kinematic) force-coupled movement (with the same start time and identical kinematics based thereon). In other words, the first driving claws and the second driving claws are not rigidly connected to each other with respect to the axial movement, for example. According to an exemplary embodiment, the first driving claws and the second driving claws are coupled to each other via at least one preload element.

The first driving claws and the second driving claws can move successively into the driving recesses. The first driving claws and the second driving claws can move out of the driving recesses one after the other. In an exemplary embodiment, it is the group of the first driving claws, which is moved before the group of the second driving claws both when closing the clutch is closed (coupling) and when the clutch is opened (decoupling) in time before the group of the second driving claws. The movements of the first driving claws and the second driving claws are staggered in time, but can overlap at times.

According to an exemplary design of the clutch unit, the first driving claws and the second driving claws are axially displaceable. In other words, an activation movement with axial direction of movement is conceivable for the clutch unit. According to an exemplary embodiment, both the activation movement of the first driving claws and the second driving claws, each in relation to the driving recesses of the secondary side, and the relative movement between the first driving claws and the second driving claws is an axial movement. Both the absolute movement of the first driving claws and second driving claws and the relative movement of the first driving claws and second driving claws during actuation are axial. It is understood that the actuation takes place regularly with the primary side rotating and, if necessary, the secondary side rotating.

According to a further exemplary embodiment of the clutch unit, the first driving claws and the second driving claws rotate in the open and in the closed state of the clutch unit with the primary side. Again, it is pointed out that terms such as first, second, primary side, secondary side and the like serve first and foremost to differentiate. According to an exemplary embodiment, the primary side is the driving side. However, exemplary embodiments with reversed assignment are conceivable. Furthermore, applications are conceivable in which, depending on the operating condition (motor drive with electric motor, recuperation with generator operation of the electric machine), the role of the driving side (drive side) and the driven side (output side) alternates between the primary side and the secondary side.

According to an exemplary embodiment, the first driving claws and the second driving claws are torsionally coupled to the primary side. According to this embodiment, there is no relative rotation between the group of the first driving claws and the group of the second driving claws. Of course, this does not exclude a possible small rotational play.

According to a further exemplary embodiment of the clutch unit, the first driving claws are assigned to a first ring and the second driving claws to a second ring. The first ring and the second ring are r movable relative to each other, at least in the (axial) direction of operation. The first ring and the second ring may be staggered in time (successively) in relation to the actuation recesses of the secondary side.

According to a further exemplary embodiment of the clutch unit, the first ring and the second ring each have a rotary driving contour which interacts with a primary side counter-contour for positive rotary driving within the primary side. The first ring and the second ring are axially displaceable relative to each other and along the counter-contour. The counter-contour is, for example, a toothing or a spline shaft geometry. Accordingly, the rotary driving contour of the first ring and the second ring is designed as a corresponding toothing or splined shaft geometry.

In an exemplary embodiment, the first ring and the second ring are seated with their rotary driving contour within the counter-contour on the primary side. The counter-contour on the primary side is therefore an inner contour in this embodiment. A reverse assignment is conceivable.

According to a further exemplary embodiment of the clutch unit, the circumference of the first ring and the second ring are provided with a rotary driving contour of the same diameter, wherein the rotary driving contours of the first ring and the second ring interact with one and the same primary side counter-contour. This simplifies the function and the production costs. In other words, the first ring and the second ring can use the same guide for the axial actuation movement, at least in sections, at least in exemplary designs.

According to a further exemplary embodiment of the clutch unit, at least the first driving claws or the second driving claws extend radially inwards towards a center, starting from the first ring or from the second ring. According to this embodiment, at least one of the two groups of driving claws is designed similarly to internal teeth. In this way, the corresponding first or second ring can be provided with the rotary driving contour on the outside and with the driving claws on the inside. This allows a compact design.

According to a further exemplary embodiment of the clutch unit, at least the first driving claws or the second driving claws extend axially from an end face of the first ring or the second ring in the direction of the secondary side. According to this embodiment, at least one of the two groups of driving claws is designed similarly to a crown wheel. In this way, the corresponding first or second ring can be provided with the rotary driving contour on the outside and with the driving claws on one end face. This allows a compact design.

According to a further exemplary embodiment of the clutch unit, the first ring is provided with driving claws which extend axially in the direction of the secondary side, wherein the second ring is provided with driving claws which extend radially inwards. This allows a compact design. In this way, the driving claws of the first ring can protrude completely or partially through the second ring, at least in exemplary embodiments.

According to a further exemplary embodiment of the clutch unit, raised actuating sections are formed on the first ring, which extend axially, starting in particular from an end face remote from the secondary side. By way of example, the actuating sections can be reached directly or indirectly by an actuator with which the clutch unit can be actuated and switched.

According to a further exemplary embodiment of the clutch unit, the first driving claws and the second driving claws are arranged alternately, wherein the first driving claws are distributed along a first diameter, and wherein the second driving claws are arranged along a second diameter. By way of example, the first diameter and the second diameter are each an average effective diameter. The first diameter and the second diameter can be identical, but can also differ from each other.

The alternating arrangement includes a change between first driving claws and second driving claws along the circumference of the clutch unit, in particular a strict change. If there is no relative rotation between the first driving claws and the second driving claws, nothing changes in the alternating arrangement adopted during the original assembly.

According to a further exemplary embodiment, the clutch unit also has an actuator, in particular a single actuator, which acts on the first driving claws to move the first driving claws between the engaged position and the disengaged position with respect to the driving recesses, and wherein the first driving claws and the second driving claws are coupled together in such a way that the movement of the first driving claws generates a biasing force for the same-direction movement of the second driving claws.

By way of example, the first driving claws and the second driving claws are coupled to each other in such a way that when the clutch unit is actuated by the actuator, energy is stored which is later used to generate the movement of the second driving claws that is offset in time (compared to the initial movement of the first driving claws) can be released.

By way of example, an elastic and/or resilient coupling between the first driving claws and the second driving claws is conceivable. By way of example, the actuator can move the first driving claws, which also includes storing energy between the first driving claws and the second driving claws, and the stored energy is released later to move the second driving claws. In other words, according to an exemplary embodiment, the first driving claws are capable of indirectly displacing the second portable claws after the first driving claws have been displaced by the actuator.

This functionality refers, for example, to the engagement of the first driving claws and the second driving claws, i.e., the closing of the clutch. In principle, this functionality is also conceivable when opening the clutch, i.e., when the first driving claws and the second driving claws are disengaged.

According to a further exemplary embodiment, the actuator acts directly on the first driving claws in order to move them. This may include a direct, rigid entrainment of the first driving claws by the actuator in the actuation direction.

According to a further exemplary embodiment, the actuator acts indirectly via at least one preload element on the first driving claws in order to shift them. According to this embodiment, the actuator acts indirectly on the first driving claws. The at least one preload element can serve as a buffer and energy storage. This comes into play, for example, if at the given relative position (relative rotation) the first driving claws are directly opposite raised driving claws on the secondary side, so that it is momentarily not possible for the first driving claws to engage in the associated driving recesses of the secondary side. The at least one preload element can then store the actuating energy and release it as required when the first driving claws face a gap (driving recess) on the secondary side in order to engage the first driving claws there. In this way, robust and error-free actuation is possible.

According to a further exemplary embodiment of the clutch unit, at least one preload element is assigned to the first driving claws and the second driving claws. The at least one preload element can be functionally assigned as energy storage to the first driving claws and the second driving claws. The at least one preload element is used to couple the (time-staggered) movements of the first driving claws and the second driving claws.

According to a further exemplary embodiment of the clutch unit, the at least one preload element is arranged between the first driving claws and the second driving claws, wherein the at least one preload element is loaded or relieved during an axial relative movement between the first driving claws and the second driving claws. Compression usually occurs when a compression spring is loaded. A tension spring usually expands when it is loaded.

It is also conceivable to provide two or more preload elements with opposite directions of action between the first driving claws and the second driving claws. This can be done in such a way that a first preload element pushes apart the first driving claws and the second driving claws and a second preload element pushes the first driving claws and the second driving claws against each other. In this way, an equilibrium position (axial relative position) results. It is understood that a plurality of first preload elements and a plurality of second preload elements may be installed.

According to a further exemplary embodiment of the clutch unit, at least one preload element is designed as a spring or spring assembly. In particular, the at least one preload element comprises at least one disc spring or wave spring. In this way, either a high or low spring rate can be achieved. Several disc springs or wave springs can form packages. For example, the effective stroke of the spring or the spring assembly is adapted to the actuating stroke of the actuator and can correspond to this in particular.

The diameter of such a disc spring or wave spring may be adapted to the respective diameter of the first ring and the second ring. For example, the mean diameter of the disc spring or wave spring is greater than the mean effective diameter of the first driving claws.

By way of example, at least one preload element is designed as a helical spring. Coil springs can be designed as compression springs or as tension springs. In an exemplary embodiment, three or more coil springs are disposed circumferentially around the clutch unit between the first ring and the second ring. In this way, the desired elasticity and energy storage capacity between the first ring and the second ring can be achieved with a plurality of springs having a small diameter.

According to a further exemplary embodiment of the clutch unit, at least one further preload element is arranged on the side of the second driving claws facing away from the first driving claws. This preload element serves as a return spring, for example. In an exemplary embodiment, the further preload element acts on the second ring and pushes it against the first ring and towards the actuator. In other words, it is ensured that the second driving claws also follow the disengaging movement of the first driving claws when the clutch is opened (decoupling).

According to a further exemplary embodiment, a further preload element is provided which is supported on the first ring and pushes the second ring in the direction of the first ring. A similar functionality (return spring) can be achieved with such an embodiment. This ensures that the second driving claws also follow the disengaging movement of the first driving claws when the clutch is opened (decoupling).

The clutch unit has two or more preload elements which serve different functions, according to an exemplary embodiment. According to this embodiment, a first preload element (first type) is used to push apart the first ring with the first driving claws and the second ring with the second driving claws when the actuator actuates the first ring to move the first driving claws towards the driving recesses of the secondary side.

Another preload element (second type) can be used to push the second ring with the second driving claws in the direction of the first ring with the first driving claws, like a return spring. This ensures that when the clutch is opened (decoupling), not only the first driving claws but also the second driving claws move safely out of the engaged state in relation to the driving recesses provided on the secondary side. Another preload element (third type) can serve as an elastic coupling between the actuator and the first ring with the first driving claws.

According to a further exemplary embodiment of the clutch unit, the group of the first driving claws and the group of the second driving claws in the engaged position are coupled to a secondary-side driving body on which the driving recesses are arranged.

In an exemplary embodiment, the driving body is a differential nest or a differential carrier of a differential. The driving claws are formed, for example, as teeth that engage in tooth gaps (driving recesses).

According to a further exemplary embodiment of the clutch unit, the group of the first driving claws can be engaged in a group of first driving recesses on the driving body, wherein the group of the second driving claws can be engaged in a group of second driving recesses on the driving body. In other words, two groups of driving recesses are provided on the secondary side. Accordingly, the secondary side may also be provided with two groups of driving claws, between which the driving recesses are formed. The two groups of driving recesses differ from each other, for example in relation to the respective diameter of the arrangement. Within a group, the driving recesses are usually similar or identical.

According to a further exemplary embodiment of the clutch unit, the first driving recesses are arranged on a front side of the driving body, wherein the second driving recesses are arranged on an (inner) circumferential section of the driving body. This has the advantage that the group of the first driving recesses and the group of the second driving recesses have different diameters. Accordingly, the first driving claws and the second driving claws of the primary side may be arranged along different diameters, which are adapted to the respective diameters of the assigned first driving recesses and second driving recesses. This allows a compact design, at least in exemplary embodiments.

In an exemplary embodiment, a driving claw of the first group of driving claws moves into a driving recess of the first group of driving recesses, wherein in each case a driving claw of the second group of driving claws moves into a driving recess of the second group of driving recesses.

According to a further exemplary embodiment of the clutch unit, the torque transmission between the primary side and the secondary side takes place in the engaged state in a first direction of rotation via the first driving claws and in a second direction of rotation via the second driving claws.

In this embodiment, the rotational transfer and torque transmission in the clutch unit takes place via flanks of the first driving claws and the second driving claws facing away from each other. In other words, the gaps (driving recesses) and teeth (driving claws) are designed in such a way that only one engagement configuration is possible, regardless of the respective direction of rotation. This engagement configuration allows a small amount of rotational play, but when the movement is reversed, the flanks that are respectively transmitting the torque change between the first driving claws and the second driving claws.

According to an exemplary embodiment, the first driving claws and the second driving claws are similarly designed in terms of their torque transfer capacity.

According to a further exemplary embodiment of the clutch unit, the torque is transferred between the primary side and the secondary side in the engaged state in a first direction of rotation and in a second direction of rotation via the same group of driving claws, with the torque being transferred via flanks of the driving claws facing away from each other.

In this embodiment, the rotational engagement and torque transmission takes place via flanks facing away from each other of one and the same group of driving claws. An example is the second group of driving claws. According to this exemplary embodiment, the first driving claws on the primary side, the first driving recesses on the secondary side and the second driving claws on the primary side and the second driving recesses on the secondary side are designed in such a way that there are two engagement configurations that are adopted depending on the direction of rotation. In other words, there is a different engagement configuration when driving forward than the engagement configuration when reversing. This allows only one group of driving claws, for example the second driving claws, to be used for the rotary driving and torque transmission. Consequently, this group of driving claws may be specifically adapted to the expected load.

According to an exemplary embodiment, this includes that the second driving claws assume a position in relation to the associated second driving recesses in a first direction of rotation in which a first flank of the second driving claws abuts a first counter-flank of the driving recesses, and that the second driving claws take a position in relation to the associated second driving recesses in a second direction of rotation, in which an opposite, second flank of the second driving claws abuts a second counter-flank of the driving recesses opposite the first flank.

According to a further exemplary embodiment of the clutch unit, the group of the first driving claws and the group of the second driving claws engage in a single group of driving recesses. In this design, the driving recesses consequently form sufficiently wide gaps so that there is space for both a first driving claw and a second driving claw.

According to a further exemplary embodiment of the clutch unit, the driving recesses are arranged on a front side or conical surface of the driving body.

If the (single group of) driving recesses are arranged on an end face, it is conceivable that the first driving claws are designed as driving claws extending axially from the first ring in the direction of the driving recesses. Similarly, the second driving claws may be designed as driving recesses extending radially from the second ring towards them. In other words, according to this embodiment, the first driving claws protrude through the second ring of the second driving claws in the engaged state.

Similarly, the arrangement of the driving recesses on a conical surface of the driving body allows a compact design. The conical surface of the driving body tapers towards the primary side. In the case of a driving body provided with a conical surface, it is conceivable that the first driving claws extend essentially axially in the direction of the driving body, and that the second driving claws extend essentially radially inwards. In this way, both the first driving claws and the second driving claws can jointly engage into the driving recesses.

According to a further exemplary embodiment of the clutch unit, at least two adjacent driving claws, one of which belongs to the group of the first driving claws and the other of which belongs to the group of the second driving claws, form a pair, wherein the adjacent driving claws are positionable together in a driving recess of the secondary side, especially in the engaged state. In the engaged state, there is a common sectional plane through the driving recesses as well as the first group of driving claws and the second group of driving claws, wherein the sectional plane is oriented perpendicular to a central axis through the clutch unit.

According to a further exemplary embodiment, the driving claws have flanks, at least partially in the area of their end sections facing the secondary side, which are inclined with respect to a respective direction of actuation of the driving claws.

The inclined flanks can at least simplify the engagement operation or the disengagement operation. Inclined flanks can result in a partially tapered engagement contour of the first driving claws and/or the second driving claws. Alternatively, or additionally, inclined flanks can generate a force component during decoupling when there is a speed difference and contact with counter-flanks of the secondary side, which pushes the second driving claws and/or the first driving claws in the direction of the primary side. This can increase the robustness and safety of the actuation, especially when disengaging (opening the clutch).

According to a further exemplary embodiment of the clutch unit in the case of adjacent driving claws, each of which forms a pair, the driving claws of a pair have flanks facing one another in the region of their end sections facing the secondary side, which face each other, and which are inclined to a respective actuation direction of the driving claws. In this way, support in the disengagement movement (opening of the clutch) and possibly even a simplification of the engagement movement (closing of the clutch) can result. The two inclined flanks form, for an example, a V between the adjacent first driving claws and second driving claws.

In exemplary embodiments, a control unit is provided which controls the shifting process of the clutch unit. The control unit controls the actuator, which triggers the shifting movement, for example by directly or indirectly affecting the first driving claws. However, it is also conceivable that the control unit interacts with drives, brakes, other clutches, drive components, components of the vehicle dynamics control (electronic stability control, anti-lock braking system, traction control, electronic brake force distribution and the like) and other components, which in turn directly or indirectly act on the primary side and/or the secondary side. This can be used to create a certain speed ratio between the primary side and the secondary side.

By way of example, a state can be sought for a switching operation in which the primary side and the secondary side rotate at a similar speed, but either the primary side or the secondary side rotates somewhat faster than the other side. This can occasionally support the closing of the clutch (coupling) or the opening of the coupling (decoupling). In this way, the control technology acting directly on the clutch can be designed relatively simple, for example, a single actuator is provided which is directly assigned to the clutch.

In an exemplary embodiment, the switchable clutch unit is assigned to a differential (compensation gear). By way of example, the switchable clutch unit separates, if necessary, the differential nest (driving body) of a drive wheel of the differential. The differential nest can also be called the differential basket.

By way of example, the primary side of the clutch unit is assigned to the drive wheel of the differential. For example, the secondary side is associated with the differential nest.

According to a further exemplary embodiment, the present disclosure relates to a differential designed as a differential gearbox, with a drive wheel which is coupled to a differential nest, wherein the differential comprises a switchable clutch unit according to at least one of the embodiments described herein, wherein the primary side is assigned to the drive wheel of the differential and the secondary side to the differential nest.

It is understood that the above-mentioned features of the disclosure, which are to be explained below, can be used not only in the combination specified in each case, but also in other combinations or in a unique position, without leaving the scope of the present disclosure.

BRIEF DESCRIPTION OF THE DRAWINGS

Further features and advantages of the present disclosure result from the following description of several preferred embodiments with reference to the drawings. It shows.

DETAILED DESCRIPTION OF THE EMBODIMENTS

Figure 1:
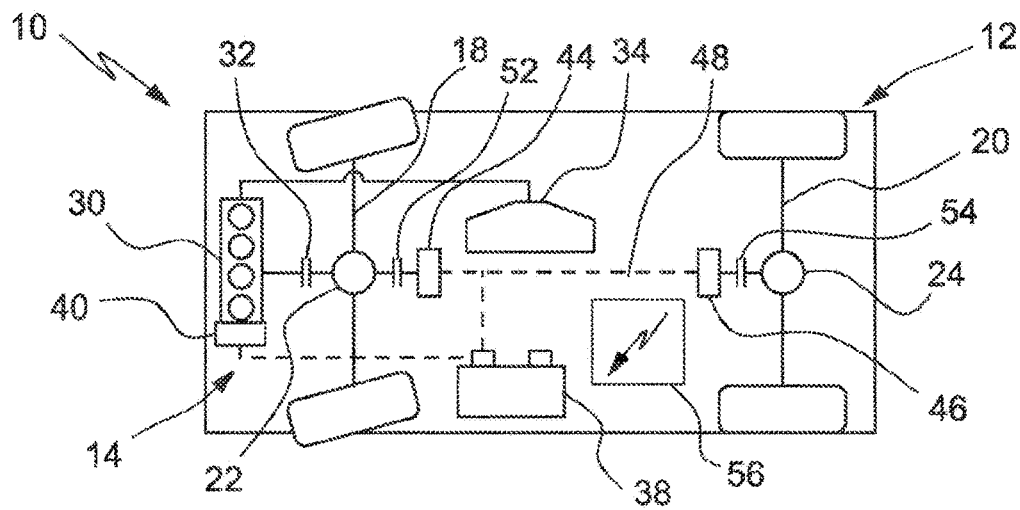
FIG. 1: a schematically simplified top view of a vehicle for illustrating drive components.

FIG. 1 shows a vehicle 10 by means of a schematically highly simplified plan view. By way of example, the vehicle 10 is a wheeled vehicle. An example is a passenger car or a light commercial vehicle. In the embodiment, it is a wheeled vehicle with two axles. The vehicle 10 comprises a chassis 12. Furthermore, a drive train 14 is provided, which can be coupled optionally with a front axle 18 and/or a rear axle 20. Depending on the selected configuration, the vehicle 10 can be driven exclusively via the front axle 18, exclusively via the rear axle 20 and a combined configuration via both the front axle 18 and the rear axle 20. However, this is not to be understood as restrictive.

The front axle 18 is assigned a front differential 22. The rear axle 20 is assigned a rear differential 24. The differentials 22, 24 can also be referred to as differential gears. For example, a differential comprises one input (drive shaft) and two outputs (right wheel, left wheel). However, this is not to be understood as restrictive. Especially in vehicles 10 with all-wheel drive and/or a plurality of drive engines (internal combustion engine or electric motor) may provide for more complex mechanisms and gearboxes for coupling the drives.

The drive train 14 comprises an internal combustion engine 30 (installed transversely here). The combustion engine 30 is coupled in the embodiment via a clutch 32 with the differential 22. It is understood that the internal combustion engine 30 and the clutch 32 are usually interposed by a gearbox to provide a desired ratio. The internal combustion engine 30 is supplied by a fuel tank 34 with fuel (gasoline, diesel, synthetic fuel or the like).

The combustion engine 30 is further coupled with a battery 38 (energy storage). In the embodiment, the internal combustion engine 30 is mechanically coupled to a generator 40, which can supply the battery 38 with energy when operating the internal combustion engine 30. Also, a clutch (not shown in FIG. 1) may be provided between the combustion engine 30 and the generator 40. It is understood that the battery 38 can also be fed/charged externally via the stationary power grid, at least in exemplary embodiments.

In the exemplary embodiment, the battery 38 feeds an electric motor 44 assigned to the front axle 18 and an electric motor 46 assigned to the rear axle 20 via a supply line 48. The electric motors 44, 46 can optionally be controlled. In the embodiment, there is no mechanical coupling (in the sense of a cardan shaft or the like) between the front axle 18 and the rear axle 20. Instead, for example, all-wheel drive can be effected by using the plurality of engines 30, 44, 46 via a drive control 56.

In this embodiment, the electric motor 44 is coupled with the differential 22 of the front axle 18 via a clutch 52. In the exemplary embodiment, the electric motor 46 is coupled to the differential 24 of the rear axle 20 via a clutch 54. During operation of the vehicle 10, at least the clutches 32, 52, 54 can be selectively switched by the drive control 56 to connect or disconnect the engine 30 and the motors 44, 46. In this way, various drive components of the drive train 14 can be coupled. This can, for example, reduce friction by avoiding overrun operation (overrun cut-off). Something similar can be done when using only one of the axles 18, 20 is used for drive (instead of all-wheel drive) if the drive components of the unused axle are decoupled. Conversely, drive components can be specifically coupled for recuperation purposes, for example. Something similar is conceivable for activating certain driving modes by the drive control 56. Gear changes for clutches 32, 52 and 54 are also conceivable in the context of vehicle dynamics control.

Figure 2:
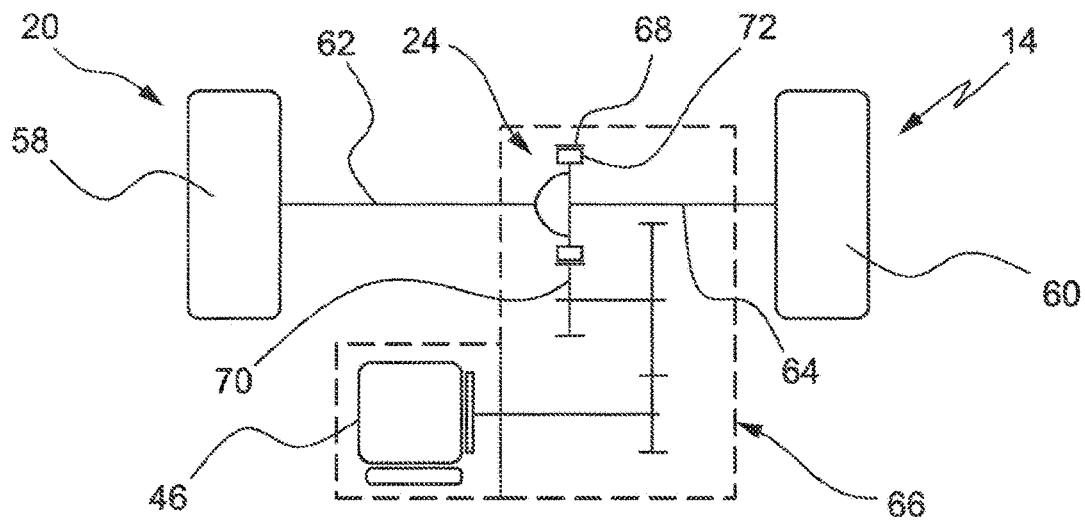
FIG. 2: another schematically simplified principle representation of a driven axle of a vehicle.

FIG. 2 illustrates by means of a schematically highly simplified representation an embodiment of a section of a drive train 14. In the execution example, a rear axle 20 of a vehicle 10 is shown. The rear axle 20 is assigned a differential 24. An electric motor 46 is provided for driving the rear axle 20. The rear axle 20 comprises wheels 58, 60, which can also be referred to as the right and left wheel. The differential 24 is coupled to the wheel 58 via a drive shaft 62 and to the wheel 60 via another drive shaft 64.

The electric motor 46 is coupled via a power transmission 66 with a drive wheel 68 associated with the differential 24. The transmission 66 may comprise one or more gear stages. In the embodiment, the power transmission 66 comprises a pinion 70 which meshes with the drive wheel 68. Furthermore, a clutch 72 is provided, which in the embodiment is arranged between the drive wheel 68 and the differential 24. In this way, a switchable rotational driving coupling can be provided between the electric motor 46 and the differential 24 and consequently the axis 20.

Figure 3:
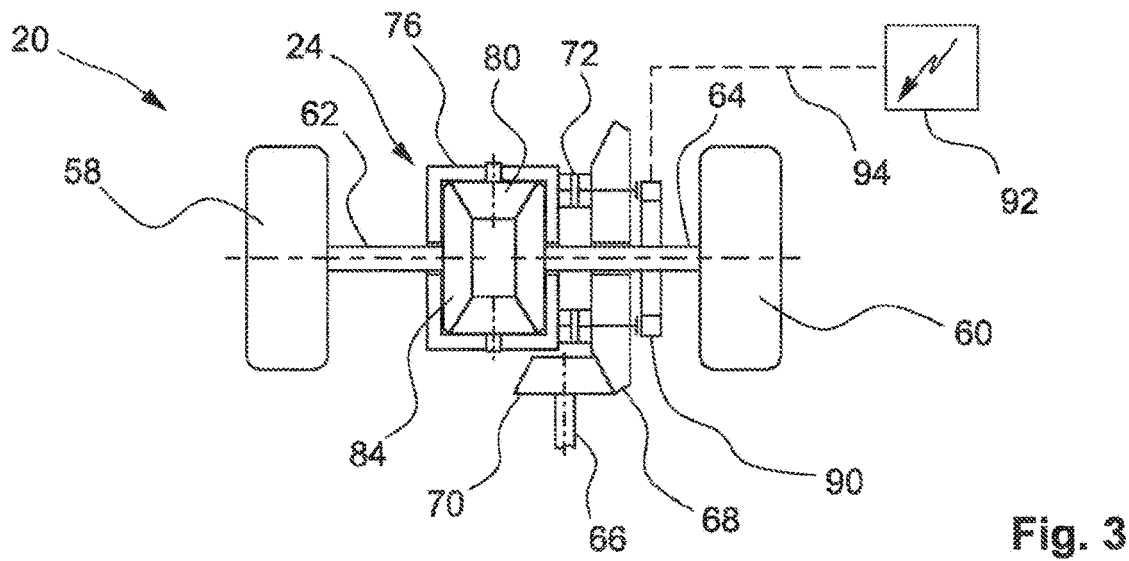
FIG. 3: another schematic view of a driven axle of a vehicle comprising a switchable differential.

On the basis of FIG. 2, FIG. 3 illustrates the design of an embodiment of the differential 24 of the axis 20 with a different level of detail. A power transmission 66 is connected to a pinion 70, which meshes with a drive wheel 68. In the embodiment according to FIG. 3, the pinion 70 and the drive wheel 68 form a bevel gear stage. In the embodiment according to FIG. 2, however, a spur gear stage is indicated. Other mechanisms are conceivable.

The drive wheel 68 is coupled via a clutch 72 to a differential carrier 76 of the differential 24. The differential carrier 76 can also be referred to as differential nest or differential basket. The differential carrier 76 may rotate around the axis 20 of the rear axle 20 when driven by the drive wheel 68. In the exemplary embodiment, the differential carrier 76 carries bevel gears 80 (pinion gears), which are rotatably mounted on the circumference of the differential carrier 76. The bevel gears 80 engage in bevel gears (side gears) 84 whose axes of rotation are oriented concentrically to the axis 20 or to the drive shafts 62, 64. The axes of the bevel gears 80 and 84 are oriented orthogonally to each other by way of example. The bevel gears 84 are coupled to the drive shafts 62, 64 to drive the wheels 58, 60. The differential 24 ensures favorable power distribution and torque distribution, even at different speeds of the wheels 58, 60. It is understood that the differential 24 can also be designed in other ways.

In the exemplary embodiment, a clutch 72 is provided between the drive wheel 68 and the differential carrier 76, which couples the drive wheel 68 and the differential carrier 76 as required for rotary driving or decoupling them from each other. An actuator 90 is provided for controlling the clutch 72, which is connected via a control line 94 to a control unit 92. The control unit 92 may be formed as part of the drive control 56 (FIG. 1). By way of example, the actuator 90 is designed to displace elements of the shifting clutch 72 axially in order to shift the clutch 72. A corresponding control pulse is generated by the control unit 92.

FIGS. 1-3 illustrate conceivable applications for clutches in vehicles without being restrictive in this regard. This includes, for example, the integration of clutches into differentials. However, it is understood that clutches can also be used in other ways to couple and decouple drive components. Therefore, applications of clutches according to disclosure are also conceivable without being coupled to a differential.

With reference to FIGS. 4-10, an exemplary embodiment is illustrated of a switchable clutch unit, denoted overall by 100. The clutch unit 100 can be related in principle to the above couple or decouple drive components previously described in connection with the FIGS. 1-3 in the drive train 14 of the vehicle 10.

The clutch unit 100 has a primary side 102 and a secondary side 104. The primary side 102 serves in exemplary embodiments as a drive side. The secondary side 104 serves in exemplary embodiments as the output side. However, as explained above, this attribution is not mandatory and is instead primarily for illustrative purposes.

The primary side 102 and the secondary side 104 of the clutch unit 100 can be coupled to each other for rotary driving. In the exemplary embodiment, the rotary driving takes place in the coupled state essentially in a form-fitting manner, i.e., essentially without slipping. The clutch unit 100 is switchable.

The primary side 102 includes a rim 108, which in the embodiment includes a flange part 110 and a gear 112 serving as a drive wheel (compares with reference number 68 in FIG. 2 and FIG. 3). Furthermore, a flange part 114 is provided. The flange parts 110 and 114 are facing away from each other. In the exemplary integration of the clutch unit 100 into a differential (compares to the differential 24 in FIG. 3), the outputs (drive shafts) of the differential are passed through the flange parts 110, 114. This is not to be understood as limiting.

The secondary side 104 of the clutch unit 100 is further assigned a driving body 116. In the exemplary integration of the clutch unit 100 into a differential, the driving body 116 is formed by the differential carrier (see reference sign 76 in FIG. 3) or is connected to it. In certain embodiments, the driving body 116 is designed like a bell or like a cup. Hence the driving body 116 is also described as a differential nest or differential basket. A central axis through the clutch unit 100 is designated 118. The driving body 116 carries, by way of example, one or more seats 120 for receiving so-called bevel gears (such as the bevel gears 80 in FIG. 3).

Figure 4:
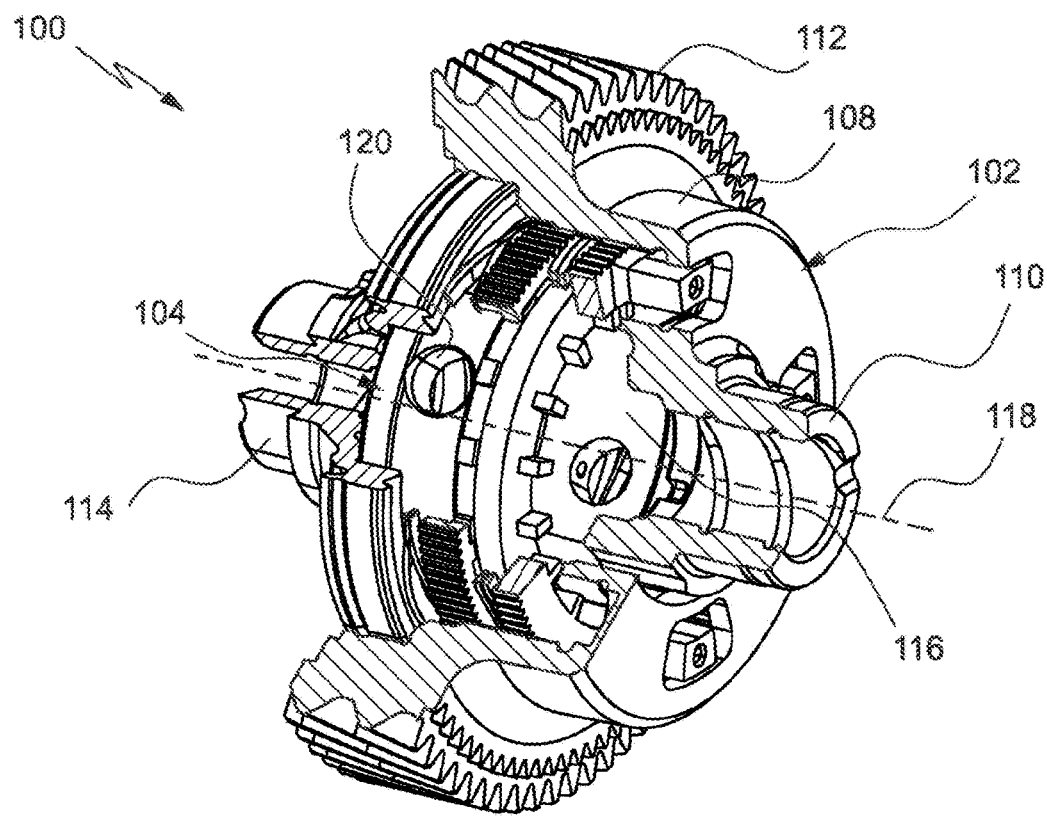
FIG. 4: a perspective, partially cut representation of an execution form of a switchable clutch unit.
Figure 5:
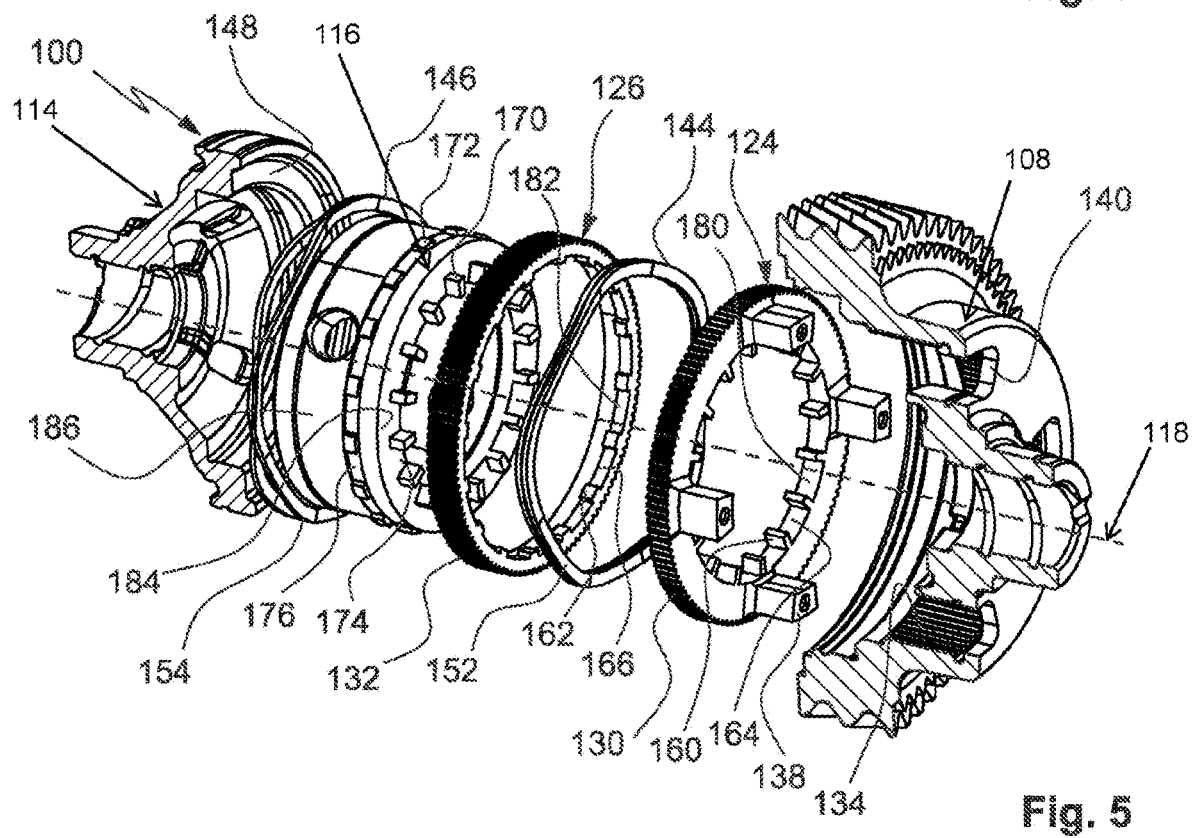
FIG. 5: an exploded, partially cut perspective view of the clutch unit according to FIG. 4.

FIG. 5 illustrates the detail design of the clutch unit 100 mounted in the rim 108 by means of a partially cut exploded perspective representation of a portion of the clutch unit 100 of FIG. 4 in the assembled state. The clutch unit 100 comprises a first ring 124 and a second ring 126, which are supported in the embodiment in the rim 108. The first ring 124 and the second ring 126 can be moved axially along the axis 118 of the clutch unit 100. The first ring 124 has a rotary driving contour 130. The second ring 126 has a rotary driving contour 132. A counter-contour 134 is formed on the rim 108. The rotary driving contours 130, 132 are exemplarily designed as external teeth. The counter-contour 134 comprises, by way of example, internal teeth adapted to the external teeth. In this way, the first ring 124 and the second ring 126 are held in a rotationally fixed but axially displaceable manner on the mating counter-contour 134 in the rim 108. The rotary driving contours 130, 132 and the counter-contour 134 may also be designed as splined shaft geometries, by way of example. Other designs are conceivable. In the exemplary embodiment according to FIG. 5, the rotary driving contours 130, 132 are designed in a similar or identical manner. Therefore, both rings 124, 126 can engage in one and the same counter-contour 134 with their rotary driving contours 130, 132.

Figure 7:
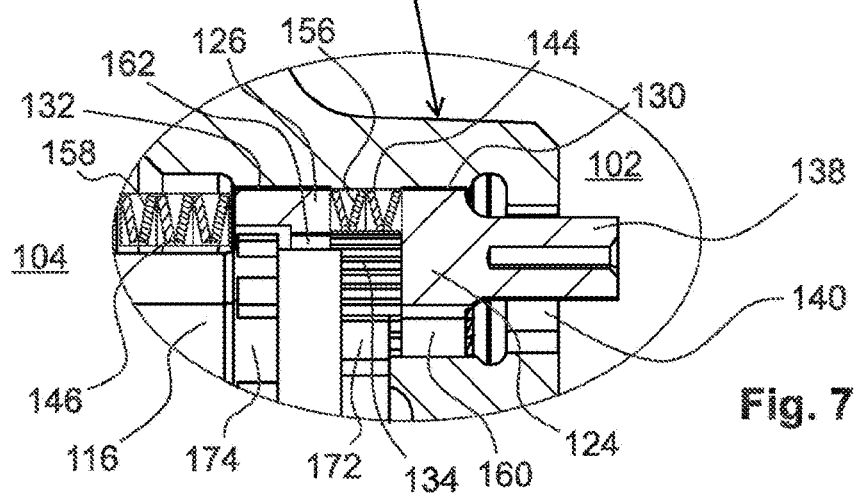
FIG. 7 and FIG. 8: enlarged partial views of the coupling according to FIG. 6 in a disengaged state (FIG. 7) and an engaged state (FIG. 8)
Figure 8:
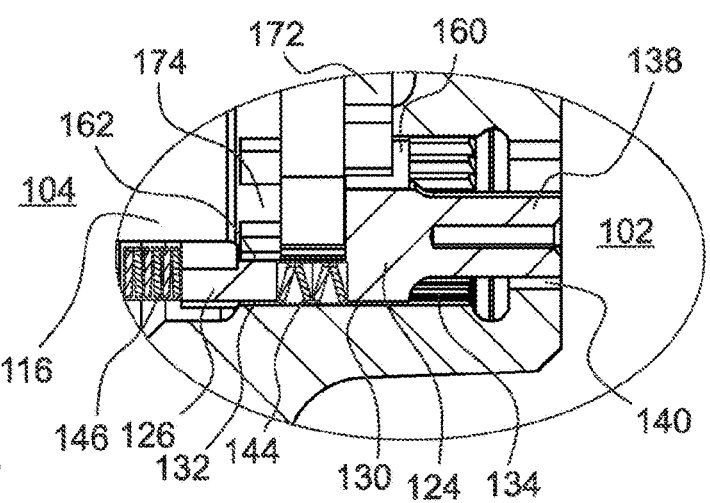

FIG. 5 further illustrates one or more actuating sections 138 on the first ring 124, see also FIG. 7 and FIG. 8. These are, for example, domes or elevations that are turned away from the secondary side 104 and extend through openings 140 in rim 108. In the exemplary embodiment, four actuating sections 138 are distributed around the circumference of the first ring 124. The actuating sections 138 are used to introduce force or to move the first ring 124 by an actuator (such as the actuator 90 in FIG. 3). In this way, the clutch unit 100 can be switched (closed and opened). It is conceivable that an actuator acts on the actuating sections 139 in a pushing and possibly also a pulling manner.

Referring to FIG. 5, at least a first preload element 144 is arranged between the first ring 124 and the second ring 126. At least a second preload element 146 is arranged between the second ring 126 and the flange part 114. In the exemplary embodiment, the at least one second preload element 146 is between a front side of the second ring 126 and an opposite contact surface 148 arranged on the flange part 114. The at least one first preload element 144 is arranged between mutually facing end faces of the first ring 124 and the second ring 126. The at least one first preload element 144 may urge the first ring 124 and the second ring 126 apart. The at least one second preload element 146 may push the flange part 114 and the second ring 126 apart.

The at least one first preload element 144 and the at least one second preload element 146 serve as energy storage, if required. In the exemplary embodiment, the at least one first preload element 144 is designed as one or more corrugated springs 152. The at least one second preload element 146 is designed, in the exemplary embodiment, as one or more corrugated springs 154. In the shown exemplary embodiment, the at least one second preload element 146 is supported on the flange part 114 in the assembled state (FIG. 4). Starting from the contact surface 148, the at least one second preload element 146, the second ring 126, the at least one first preload element 144, and the first ring 124 follow in the direction of the primary side 102. In this way, any axial play of the first ring 124 and the second ring 126 can be reduced.

The first ring 124 carries first driving claws 160. The second ring 126 carries second driving claws 162. The driving claws 160, 162 are also referred to as primary-side driving claws. The first driving claws 160 are arranged alternately with first driving recesses 164. The second driving claws 162 are arranged alternately with second driving recesses 166. The driving recesses 164, 166 can also be referred to as primary-side driving recesses.

In the exemplary embodiment, first driving claws 170 and second driving claws 172 are arranged on the driving body 116, which can be referred to as secondary-sided driving claws. The first driving claws 170 are arranged alternately with first driving recesses 174. The second driving claws 172 are arranged alternately with second driving recesses 176. The driving recesses 174, 176 can also be referred to as secondary driving recesses.

In the exemplary embodiment, the driving claws 160 and the associated driving recesses 164 of the first ring 124 are arranged on an inner circumference 180 of the first ring 124. In the exemplary embodiment, the driving claws 162 and the associated driving recesses 166 of the second ring 126 are arranged on an inner circumference 182 of the second ring 126. In the exemplary embodiment, the first driving claws 170 and the associated first driving recesses 174 of the driving body 116 are arranged on an end face 184 of the driving body 116. In the exemplary embodiment, the second driving claws 172 and the associated second driving recesses 166 of the driving body 116 are arranged on an outer circumference 186 of the driving body 116.

In the embodiment according to FIGS. 1-10, the first driving claws 160 on the primary side can engage in the first driving recesses 174 on the secondary side. Further, the second driving claws 162 on the primary side may move into the second driving recesses 176 on the secondary side. In each engaged state, the clutch unit 100 is closed and enabled for rotational driving. In each disengaged state, the clutch unit 100 is open.

Figure 6:
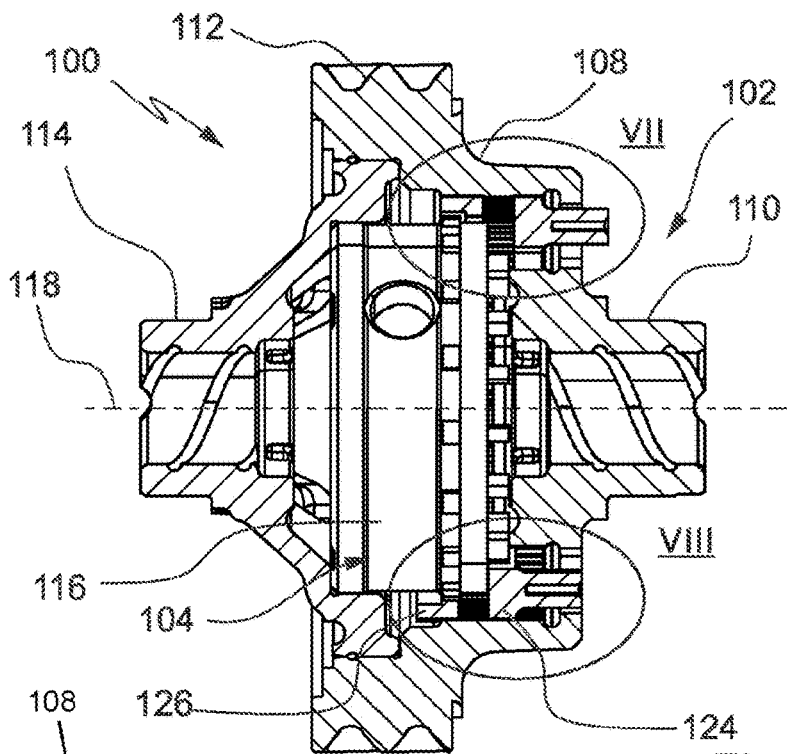
FIG. 6: a cut side view of the clutch unit according to FIGS. 4 and 5.

The operation of the clutch unit 100 is illustrated with reference to FIGS. 6-8. FIG. 6 shows a partially cut side view, wherein areas marked with VII and VIII are enlarged in FIGS. 7 and 8. FIG. 7 shows the disengaged state (clutch unit 100 is open), in which the primary side 102 and the secondary side 104 are separated and can be rotated relative to each other. FIG. 8 shows the engaged state (clutch unit 100 is closed), wherein the primary side 102 and the secondary side 104 are connected for joint rotation and torque transmission. In FIGS. 7 and 8, the preload elements 144, 146 are exemplarily designed as disc spring packages or disc springs 156, 158 (not shown true to scale).

In FIG. 7, the actuating section 138 of the first ring 124 protrudes out of the rim 108 in the direction of the primary side 102. In contrast, FIG. 8 shows that the actuating section 138 was moved in the direction of the secondary side 104 and consequently at least partially moved into the opening 140 in the rim 108 in the direction of the secondary side 104 or driving body 116.

The first ring 124 and the second ring 126 sit with their respective rotary driving contour 130, 132 in a rotationally fixed manner in the counter-contour 134 on the inner circumference of the rim 108 of the primary side 102. Thus, there is no relative rotation between the first ring 124, the second ring 126 and the rim 108 with gear 112 apart from any minimal rotational play. When the clutch is open (FIG. 7), there is no coupling for rotational driving between the primary side 102 (first ring 124, second ring 126) and the secondary side 104 (driving body 116). Thus, a relative rotation between the primary side 102 and the secondary side 104 is possible.

In the enlarged partial views of FIGS. 7 and 8, the preload elements 144, 146 are shown only symbolically as disc springs 156, 158. In this respect, FIGS. 7 and 8 differ from FIGS. 5 and 6 (with corrugated springs 152, 154). FIG. 8 shows the engaged state. In the engaged state, the first ring 124 and the second ring 126 are shifted in the direction of the driving body 116. In the exemplary embodiment, this is done by actuation of an actuator not shown in FIGS. 6-8, which acts on the actuating sections 138. In the engaged state, the driving claws 160 of the first ring 124 are engaged into the driving recesses 174 of the driving body 116. In the engaged state, the driving claws 162 of the second ring 126 are engaged into the driving recesses 174 of the driving body 116.

The axial movement of the rings 124, 126 is coupled to one another via the preload elements 144, 146. The first preload element 144 sits between the rings 124, 126. The second preload element 146 sits between the second ring 126 and a stop (i.e., contact surface 148 in FIG. 5). The second preload element 146 ensures that the second ring 126 is displaced towards the primary side 102 when the first ring 124 is displaced towards the primary side 102 by the actuator (not shown).

Figure 9:
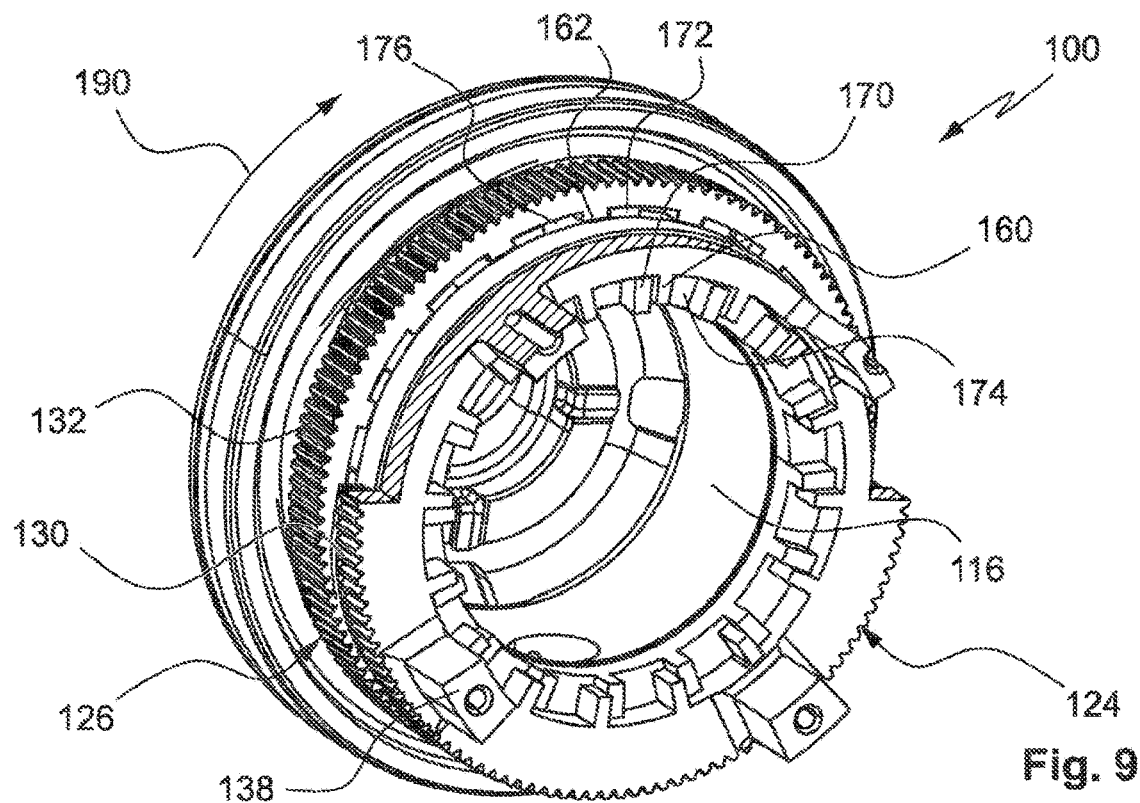
FIG. 9: another perspective, partially cut view of the clutch unit according to FIGS. 4-8, at a first direction of rotation.
Figure 10:
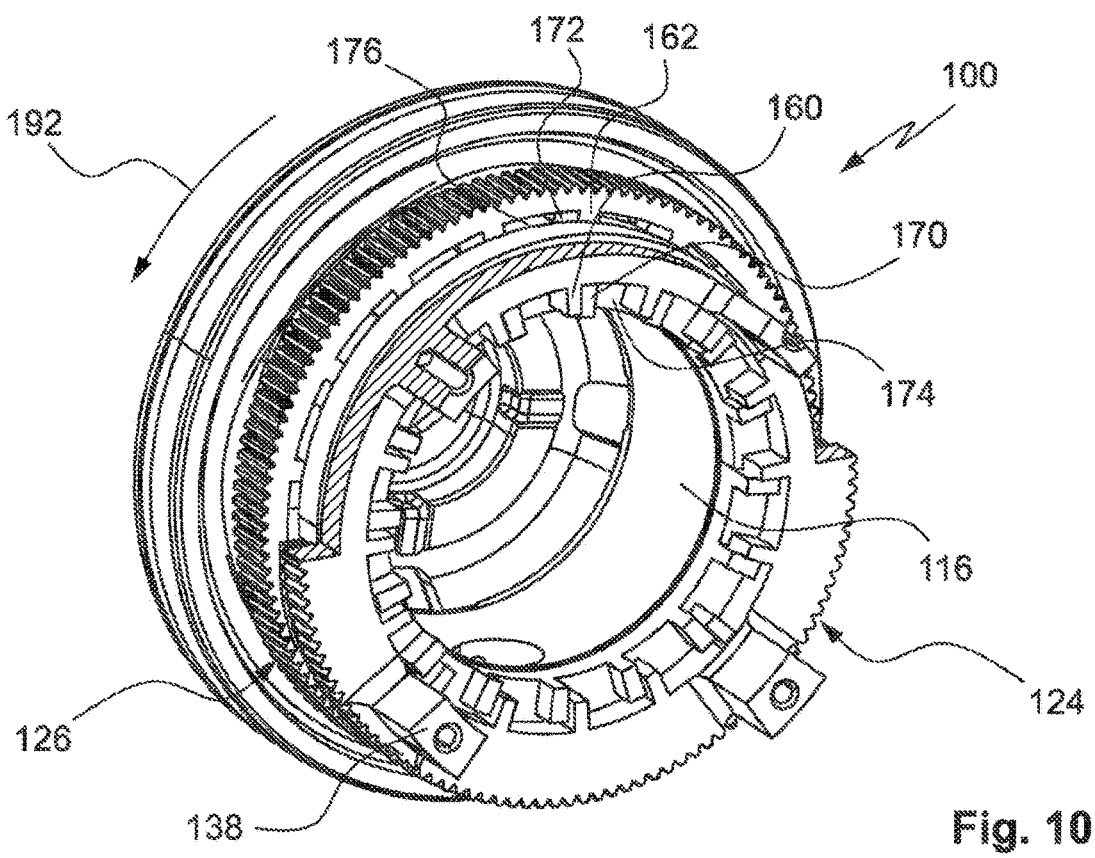
FIG. 10: another perspective, partially cut view of the clutch unit according to FIGS. 4-8, at a second direction of rotation.
Figure 11:
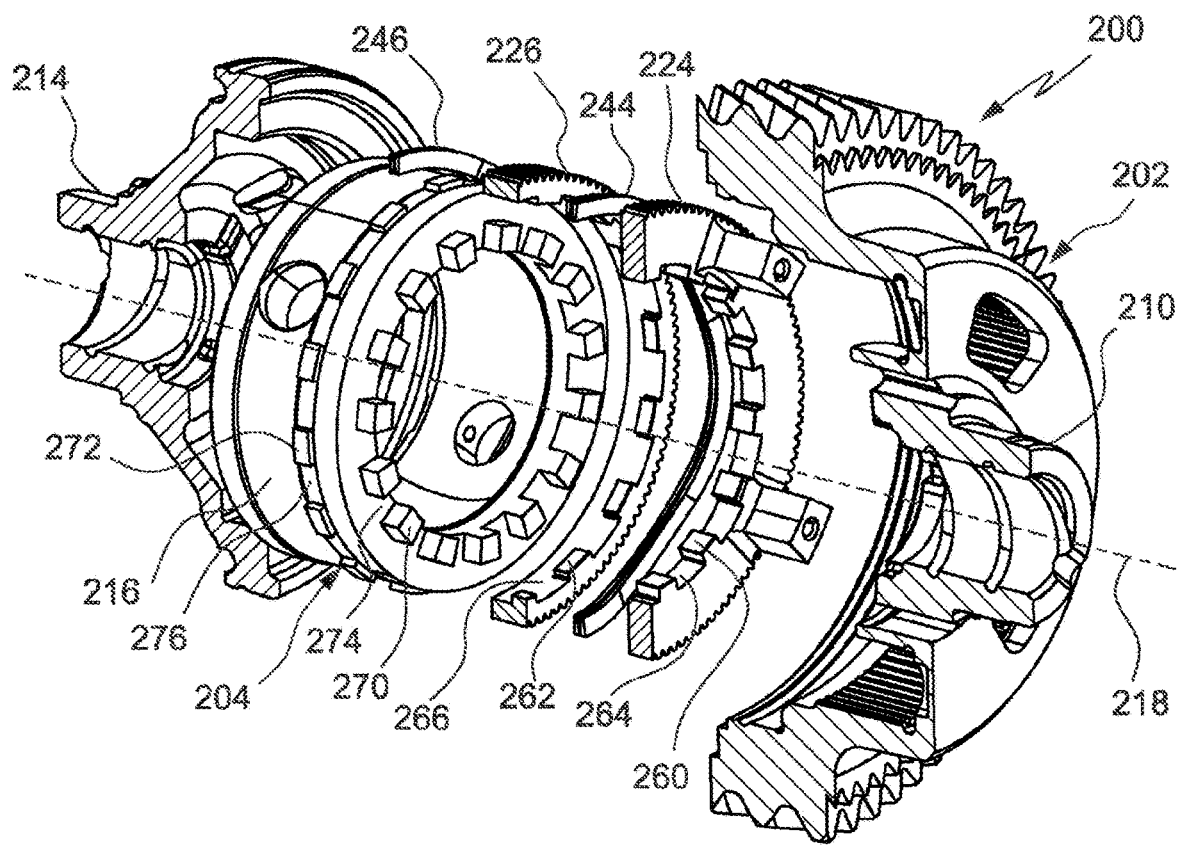
FIG. 11: an exploded, partially cut perspective view of a further embodiment of a clutch unit.

FIGS. 9 and 10 show two operating states of the clutch unit 100, wherein the clutch unit 100 is closed in both operating states. In FIG. 9, a curved arrow 190 illustrates a first direction of rotation (here: clockwise). In FIG. 10, a curved arrow 192 illustrates a second direction of rotation (here: counterclockwise direction). Both in FIG. 9 and in FIG. 10, the first ring 124 and the second ring 126 are engaged and there is a coupling between the primary side 102 and the secondary side 104 for rotary driving. One aspect of the exemplary embodiment shown is the torque transmission in both cases via the driving claws 162 of the second ring 126.

When the closed clutch unit 100 in FIG. 9 rotates in the first direction of rotation 190 (clockwise), the driving claws 162 of the ring 126 act on flanks of the driving claws 172 of the driving body 116, which are facing the driving claws 162. Also, when the closed clutch unit 100 in FIG. 10 rotates in the second direction of rotation 192 (counterclockwise), the driving claws 162 of the ring 126 act on flanks of the driving claws 172 of the driving body 116, which are facing the driving claws 162. In the given direction of rotation 190, 192, the respective driving claws 160 of the first ring 124 do not come in contact (for the transmission of significant portions of the torque) with flanks of the driving claws 170 of the driving body 116, which face the driving claws 160 in the direction of rotation 190, 192. If primarily the driving claws 162, 172 are used for engagement and torque transmission, these may be designed (reinforced) accordingly.

As illustrated by the FIGS. 9 and 10, the design makes it necessary that with a change of the direction of rotation 190, 192, the clutch unit 100 should first be opened and then closed again in the new assignment. In this way, the favorable positioning of the driving claws 162 of the second ring 126 in relation to the driving claws 172 of the driving body 116 may result.

When the rings 124, 126 of the primary side 102 move in the direction of the driving body 116 of the secondary side 104, the driving claws 160 of the first ring 124 first move into the associated driving recesses 174 (FIG. 5) between the driving claws 170. In the given direction of rotation 190, 192, a (small) relative rotation between primary side 102 and secondary side 104 then results in the desired alignment, so that the other driving claws 162 of the second ring 126 are offset with the intended offset in relation to the driving claws 172 of the second ring 126 and can engage. This includes, as required, a targeted influencing of the current angular velocity (rotational speeds) of the primary side 102 and the secondary side 104.

On the basis of FIGS. 4-10 and in particular in comparison to FIGS. 9 and 10, FIGS. 11 and 12 show a further clutch unit 200, which is fundamentally similar. In the following, differences from the clutch unit 100 according to FIGS. 4-10 will therefore primarily be discussed.

The clutch unit 200 comprises a primary side 202 and a secondary side 204. The primary side 202 comprises a flange part 210. Furthermore, a flange part 214 facing away from the primary side 202 is provided. An axis 218 defines a center or axis of rotation of the clutch unit 200. The secondary side 204 is assigned a driving body 216. The primary side 202 carries a first ring 224 and a second ring 226. The first ring 224 comprises a plurality of actuating sections 238 (FIG. 12), which have already been illustrated above in connection with the clutch unit 100. A first preload element 244 is arranged between the first ring 224 and the second ring 226. In the direction of the secondary side 204, the second ring 226 is followed by a second preload element 246.

First driving claws 260 and first driving recesses 264 arranged on the first ring 224. Second driving claws 262 and second driving recesses 266 are arranged on the second ring 226. The driving claws 260, 262 extend radially inwards from an inner circumference of the first ring 224 in the direction of the axis 218. First driving claws 270 and first driving recesses 274 are arranged on the end face of the driving body 216. Second driving claws 272 and second driving recesses 276 are arranged on the driving body towards the secondary side 204.

Figure 12:
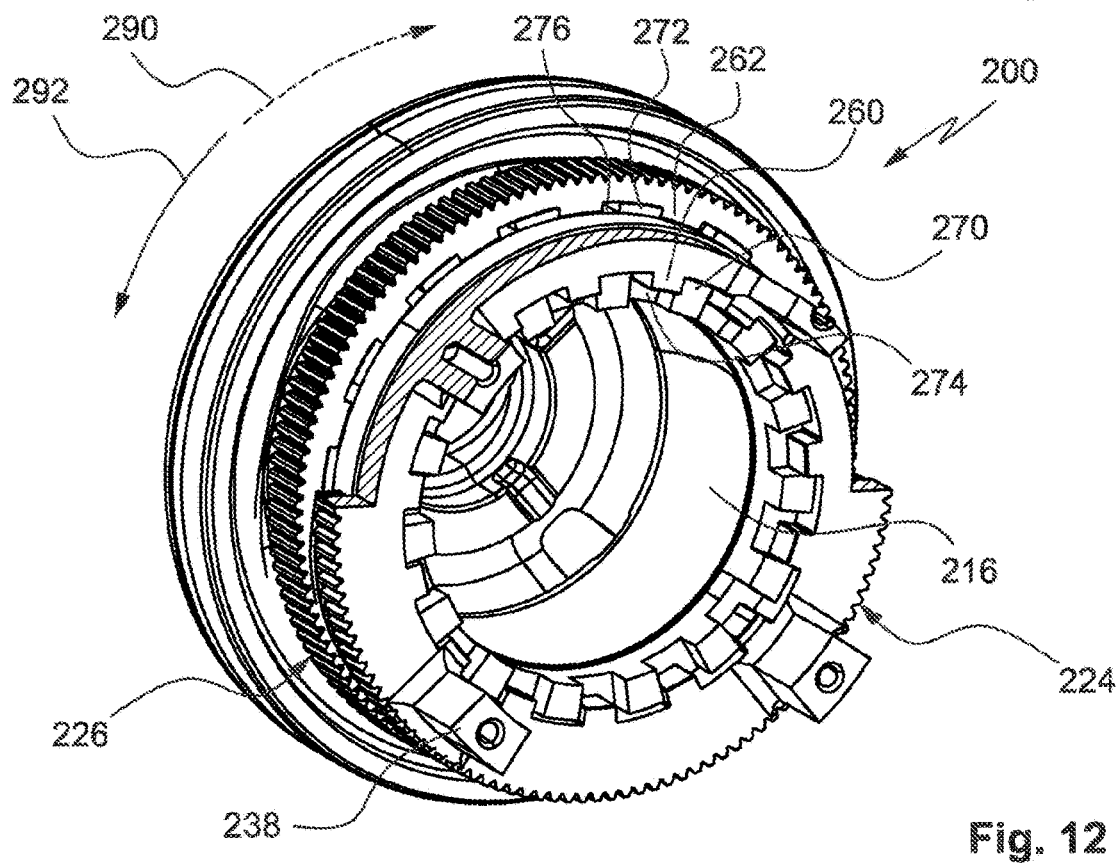
FIG. 12: another perspective, partially cut view of the clutch unit according to FIG. 11, to illustrate a first and a second direction of rotation.

FIG. 12 illustrates a difference to the design of the clutch unit 100, compare in particular the FIGS. 9 and 10. The first driving claws 260 and the second driving claws 262 are both provided for rotary driving. In the direction of rotation 290 (clockwise in FIG. 12), the rotary engagement and torque transmission takes place via the first driving claws 260 on the primary side 202, which strike the first driving claws 270 on the secondary side 204. In the direction of rotation 292 (counterclockwise in FIG. 12), the rotary engagement and torque transmission takes place via the second driving claws 262 of the primary side 202, which strike the second driving claws 272 on the secondary side 204. The engagement configuration between the primary side 202 and the secondary side 204 is the same in both directions of rotation 290, 292. When engaged, the direction of rotation can be changed. This involves an alteration of the "transferring" driving claws between the first driving claws 260 and the second driving claws 262.

On the basis of the design of the clutch units 100, 200 described above, FIG. 13 illustrate a further embodiment of a fundamentally similar clutch unit 300. In the following, therefore, differences to the clutch units 100, 200 are primarily discussed.

The clutch unit 300 comprises a primary side 302 and a secondary side 304. The primary side 302 comprises a flange part 310. Furthermore, a flange part 314 facing away from the primary side 302 is provided. A driving body 316 is assigned to the secondary side 304. An axis 318 defines a center or axis of rotation of the clutch unit 300. A first ring 324 and a second ring 326 are assigned to the primary side 302. The actuation of the clutch unit 300 is carried out in a previously described manner via actuating sections 338.

Between the first ring 324 and the second ring 326 at least a first preload element 344 is arranged. In the exemplary embodiment, the at least one first preload element 344 is a plurality of preload elements 344 (for example, four each offset by 90° preload elements with axial orientation). The preload elements 344 are exemplarily designed as coil spring 352, in particular as a compression spring. The preload elements 344 push apart the first ring 324 and the second ring 326.

A difference to the clutch units 100, 200 is to be seen in the clutch unit 300 in that second preload elements 346 are provided, which, however, are offset from the second ring 326 in the direction of the primary side 302. The second preload elements 346 are exemplarily designed as coil springs 354, in particular as compression springs. By way of example, four second preload elements 346, each offset by 90°, are provided. In the exemplary embodiment, the preload elements 346 are each seated on a guide with a head and are supported between the head of the guide and the first ring 324. In the exemplary embodiment, the guide is firmly coupled to the second ring 326. The guide protrudes at least partially through the first ring 324. This design allows the second preload elements 346 to pull the second ring 326 towards the first ring 324. Therefore, the function of the second preload elements 346 is similar to those of the second preload elements 146, 246 of the clutch units 100, 200. The preload elements 344 and 346 act in opposite directions.

Figure 14:
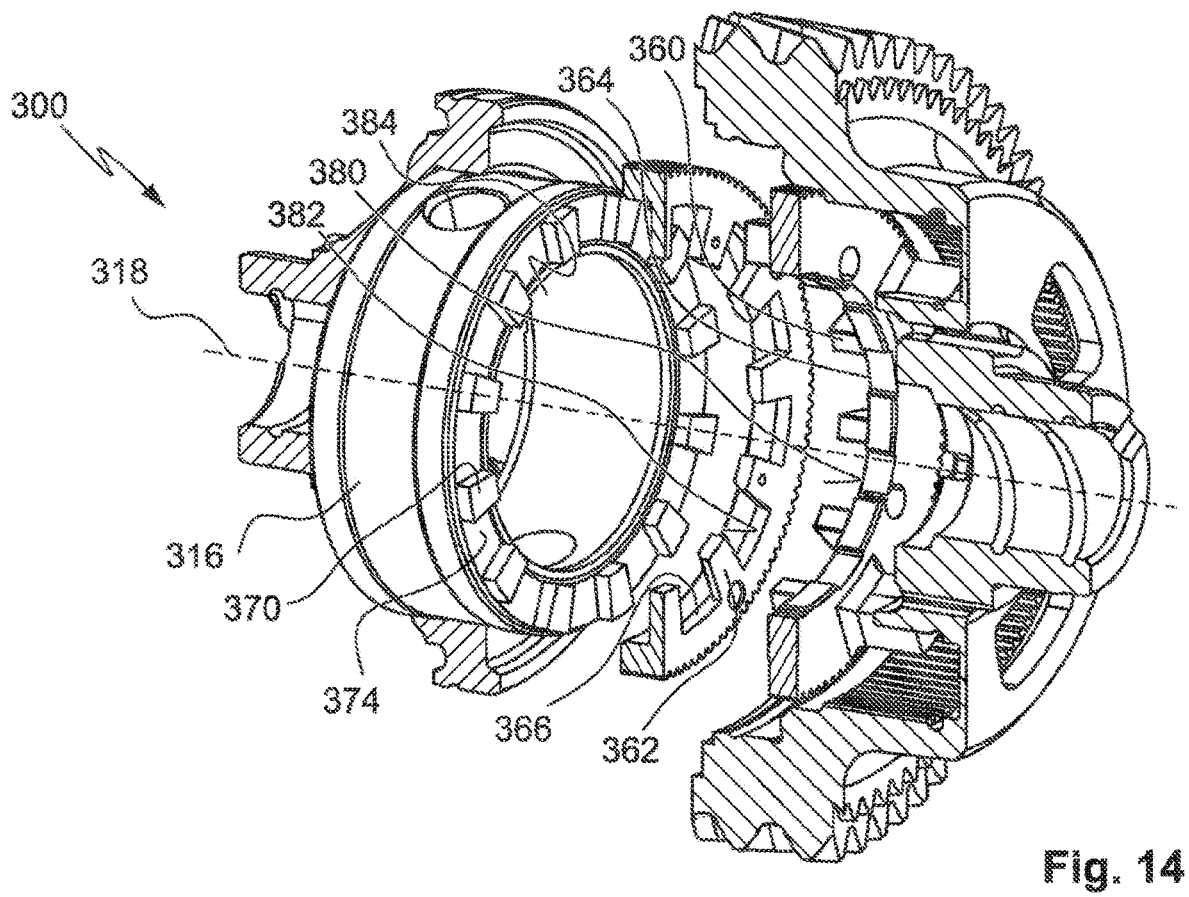
FIG. 14: an exploded, partially cut perspective view of the clutch unit according to FIG. 13.

FIG. 14 illustrates that the first ring 324 has first driving claws 360 and first driving recesses 364 formed therebetween. The driving claws 360 and the driving recesses 364 are formed on an end face 380 of the first ring 324, which faces the secondary side 304 and the driving body 316. The second ring 326 has second driving claws 362 and second driving recesses 366 formed therebetween. The driving claws 362 and the driving recesses 366 each extend radially inwards starting from a peripheral region 382 of the second ring 326.

In the exemplary embodiment, the driving body 316 comprises first (single) driving claws 370, between which first (single) driving recesses 374 are formed. The driving claws 370 and the driving recesses 374 are formed on an end face 384 on the driving body 316 facing the primary side 302. Consequently, in the exemplary embodiment, the secondary side 304 has only one group of driving claws 370 and only one group of driving recesses 374.

Figure 13:
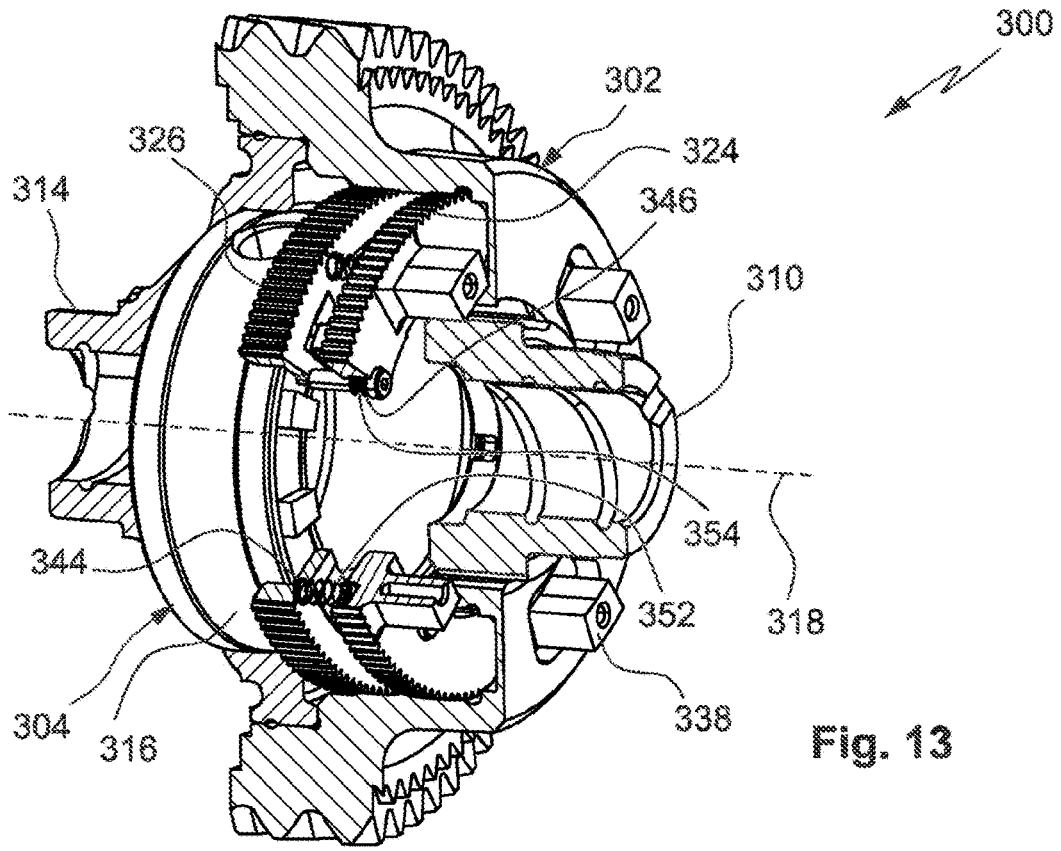
FIG. 13: a perspective, partially cut view of a further embodiment of a clutch unit.

The clutch unit 300 according to FIGS. 13 and 14 also differs from the clutch units 100, 200 in that the two primary-side groups of driving claws 360, 362 form pairs, which each engage together in one of the secondary-side driving recesses 374. The engagement configuration shown ensures rotational driving and torque transmission between the primary side 302 and the secondary side 304, regardless of the direction of rotation. The role of the driving (torque transmitting) driving claws can switch between the driving claws 360, 362 depending on the direction of rotation.

Figure 15:
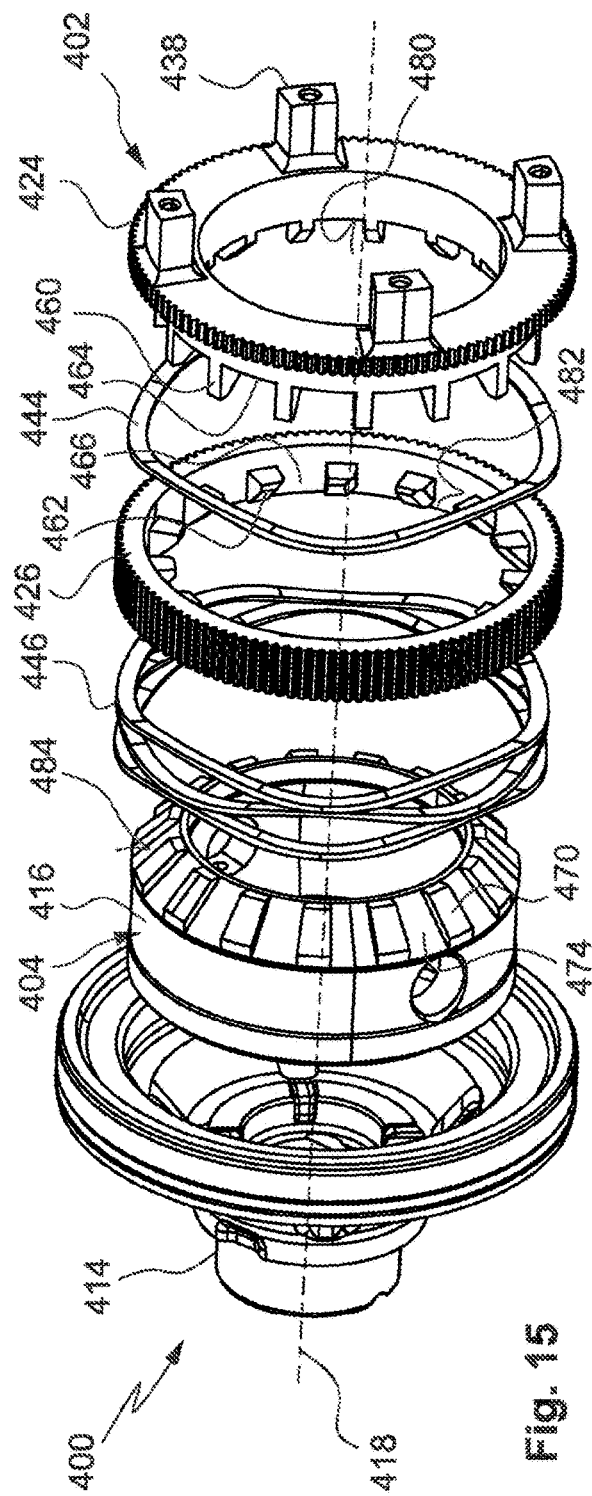
FIG. 15: an exploded, partially cut perspective view of a further embodiment of a clutch unit.
Figure 16:
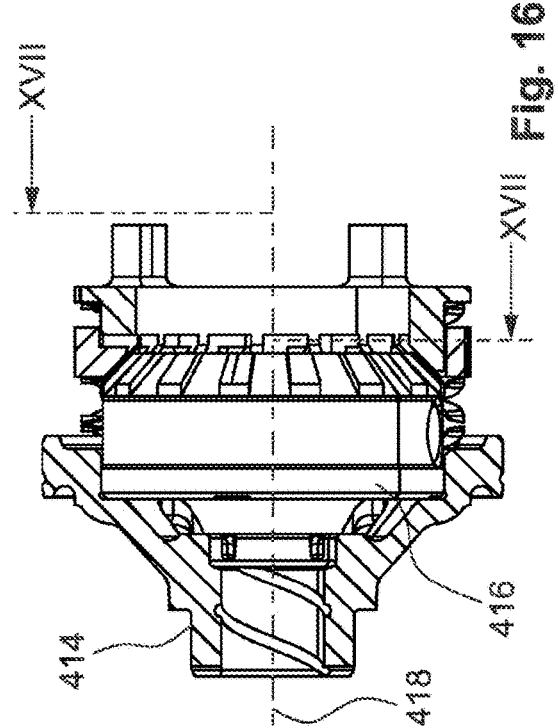
FIG. 16: a partially cut side view of the clutch unit according to FIG. 15.
Figure 17:
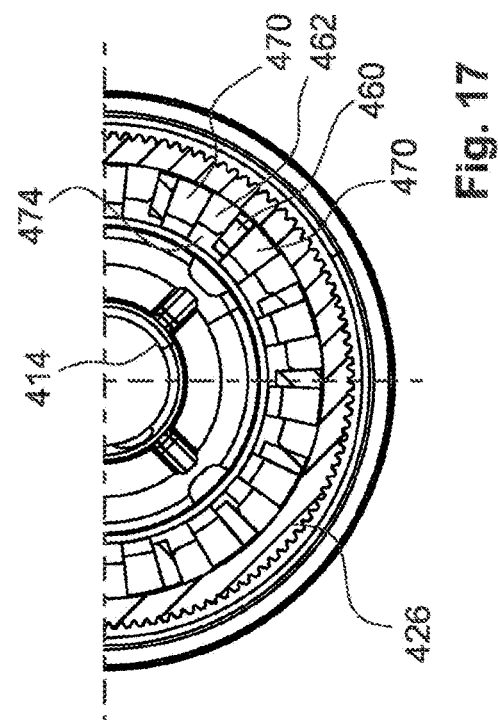
FIG. 17: a cut, frontal partial view of the clutch unit according to FIG. 16 along the line XVII-XVII in FIG. 16.

A further exemplary embodiment of a clutch unit 400 is illustrated based on FIGS. 15-17. The clutch unit 400 is designed at least similarly to the clutch units 100, 200, 300. In the following, any differences are therefore primarily discussed.

The clutch unit 400 comprises a primary side 402 and a secondary side 404. The representation of a primary-sided flange part or rim was omitted in FIGS. 15-17. The secondary side 404 comprises a driving body 416, which is at least partially surrounded by an adjacent flange part 414. An axis 418 defines a center or axis of rotation of the clutch unit 400. The primary side 402 comprises a first ring 424 and a second ring 426 in a basically already described manner. The first ring 424 carries actuating sections 438 for switching the clutch unit 400 by an actuator (not shown in FIGS. 15-17). At least a first preload element 444 is arranged between the first ring 424 and the second ring 426. In the exemplary embodiment, at least a second preload element 446 is further provided, which is arranged on the side of the second ring 426 facing the secondary side 404. The preload elements 444, 446 are designed in the embodiment example as corrugated springs.

The first ring 424 carries alternately arranged first driving claws 460 and first driving recesses 464. The first driving claws 460 and the first driving recesses 464 are arranged on an end face 480 of the first ring 424, which is facing the secondary side 404. The second ring 426 carries alternately arranged second driving claws 462 and second driving recesses 466. The second driving claws 462 and the second driving recesses 466 are arranged on an inner circumference 482 of the second ring 426 and extend radially inwards in the direction of axis 418.

A cone surface 484 is formed on the driving body 416, on which secondary-side driving claws 470 are arranged, which alternate with secondary-side driving recesses 474. In the exemplary embodiment, the secondary side 404 has a (single) group of driving claws 470 and a (single) group of driving recesses 474. Both the first driving claws 460 and the second driving claws 462 of the primary side 402 are beveled and adapted to a cone angle of the cone surface 484 of the driving body 416.

Based on the exploded perspective view of the clutch unit 400 according to FIG. 15, FIG. 16 shows a partially cut side view. FIG. 17 shows a partially cut frontal partial view of the clutch unit 400 along line XVII-XVII in FIG. 16. The driving claws 460, 462 of the primary side 402 form pairs, each of which moves together into the driving recesses 474 of the secondary side 404. The engagement configuration shown ensures rotational driving and torque transmission between the primary side 402 and the secondary side 404, regardless of the direction of rotation. The role of the driving (torque transmitting) driving claws can change between the driving claws 460, 462 depending on the direction of rotation.

With reference to FIGS. 18-25, a further embodiment of a switchable clutch unit 500 is illustrated by means of a partial view of an imaginary development. The schematic views of FIGS. 18-25 can be supplemented by way of example in terms of the embodiments of the clutch unit 300 according to FIGS. 13 and 14 or the clutch unit 400 according to FIGS. 15-17. Different designs are possible. The sequence of FIGS. 18-21 illustrates an engagement process for closing (coupling) the clutch unit 500. The sequence of FIGS. 22-26 illustrates a release process for opening (decoupling) the clutch unit 500.

In FIGS. 18-25, an arrow marked 528 illustrates a currently selected (global) direction of rotation based on the section labeled with a solid line. The opposite section, which is drawn with a dashed line, illustrates an opposite direction of rotation, which in principle can also be used. The currently selected direction of rotation 528 is the direction of rotation in which the rotational driving or torque transmission takes place in the engaged state of the clutch unit 500.

Figure 18:
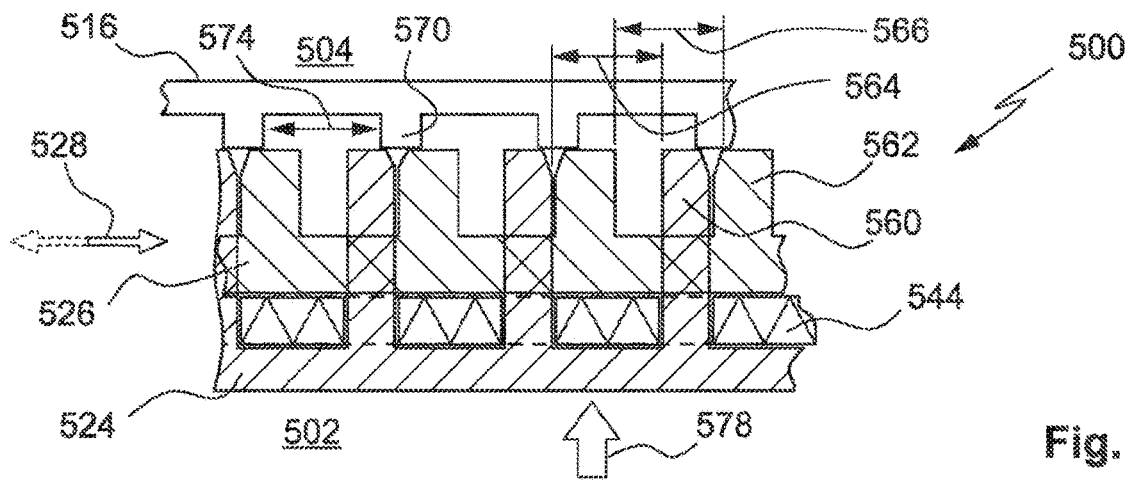
FIG. 18-21: a plurality of schematically highly simplified partial views for illustrating a further embodiment of a clutch unit, in the case of an engagement process.

FIG. 18 shows a disengaged state of the clutch unit 500, in which a primary side 502 and a secondary side 504 are rotatable independently. There is no rotation. There is no torque transmission in the disengaged state. The primary side 502 comprises a first ring 524 and a second ring 526. The secondary side 504 comprises a driving body 516. In the embodiment, at least one preload element 544 is arranged between the first ring 524 and the second ring 526, which pushes apart the first ring 524 and the second ring 526.

The first ring 524 has first multi-sided driving claws 560. The second ring 526 has second driving claws 562 on the primary side 502. First driving recesses 564 are formed between the first driving claws 560 on the primary side 402. Second driving recesses 566 are formed between the second driving claws 562 on the primary side 502. The driving body 516 has first (only) secondary-side driving claws 570 and between them arranged first (only) secondary-side driving recesses 574. Two adjacent primary-side driving claws 560, 562 form a pair in the exemplary embodiment, which is adapted to a given width of the secondary-sided driving recesses 574 in order to be able to engage there together (but possibly consecutively).

An actuation that triggers the shifting process is illustrated in FIG. 18 by an arrow marked with 578. The actuation 578 thus comprises pressing the first ring 524 in the direction of the secondary side 504. This actuation impulse ensures that in the relative orientation shown in FIG. 19 between primary side 502 and secondary side 504, the first ring 524 with the first primary-side driving claws 560 can move into the driving recesses 574 provided on the secondary side 504. In the relative orientation shown in FIG. 19, this includes a pre-tensioning of the at least one preload element 544. In other words, energy is stored in the preload element 544.

Figure 19:
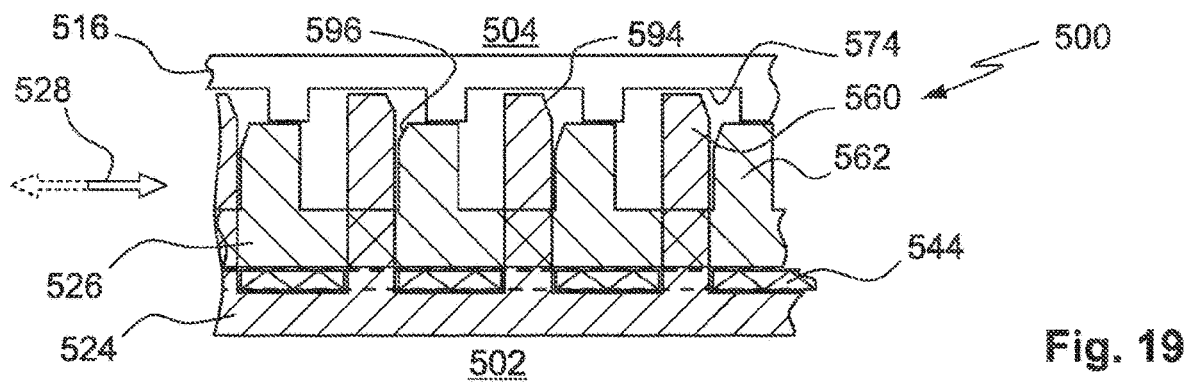
Figure 20:
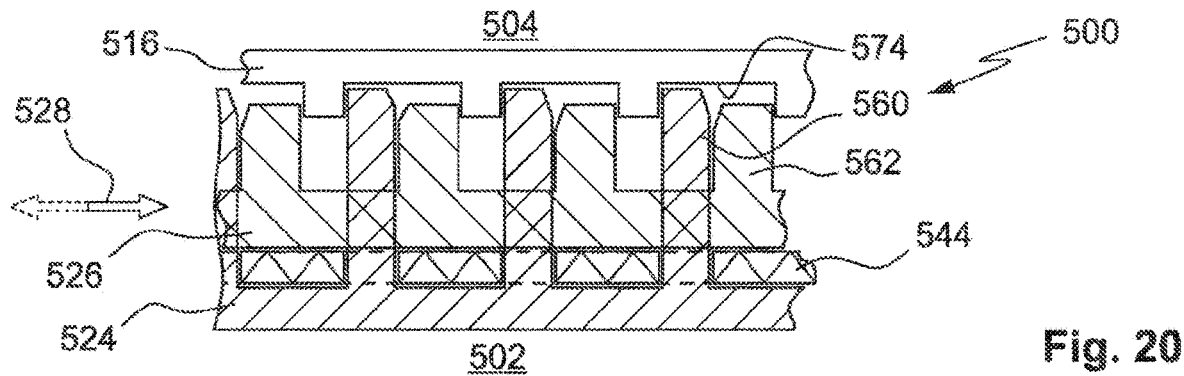

Starting from the relative orientation shown in FIG. 18, the relative orientation shown in FIG. 19 can be caused by a (possibly very small) speed difference between the primary side 502 and the secondary side 504. A comparison of FIGS. 19 and 20 illustrates that the next target orientation (FIG. 20) is a state in which a gap formed by a secondary-side driving recess 574 between the secondary-sided driving claws 570 is sufficient for a pair of adjacent first driving claws 560 and second driving claws 562 exactly opposite, so that the second driving claws 562 can also engage in the driving recesses 574. This is supported by the energy stored in the preload element 544. The preload element 544 pushes the second ring 526 in the direction of the secondary side 504 at the position given in FIG. 20.

Starting from FIG. 19, the orientation in FIG. 20 can be achieved in that the secondary side 504 rotates at a higher angular speed than the primary side 502. It is conceivable to decelerate the primary side 502 for this purpose (possibly only for a short time). In principle, it is also conceivable to accelerate the secondary side 504 for this purpose (possibly only for a short time).

Figure 21:
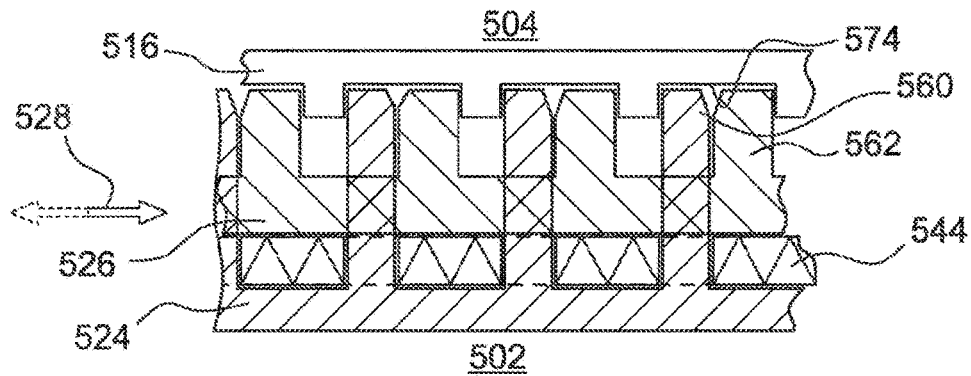

Finally, FIG. 21 shows the completely engaged state. The clutch unit 500 is closed. The preload state of the preload element 544 in FIGS. 18 and 21 is comparable or identical. In the engaged state, rotary driving and torque transmission is possible in the direction of rotation 528 (solid arrow) but also in the opposite direction of rotation (dashed arrow). It is therefore possible to transfer movement both clockwise and counterclockwise, similarly to the previously illustrated designs of the clutch units 300 and 400. Again, reference is made in this context to various operating modes such as forward travel, reversing, "coasting" or "gliding" with decoupled drive, as well as recuperation with generator operation.

Figure 22:
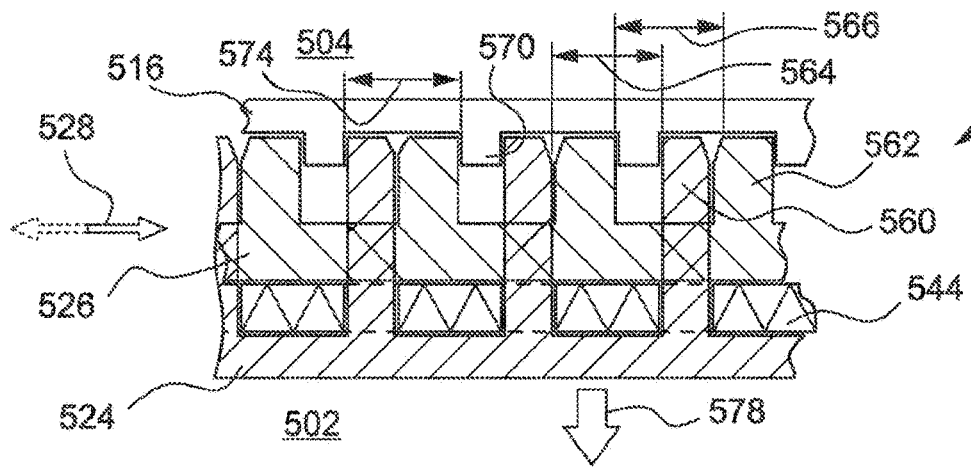
FIG. 22-25: a plurality of schematically highly simplified partial views for further illustration of the clutch unit according to FIGS. 18-21, in a disengagement process.

FIG. 22 is basically based on the engaged state shown in FIG. 21 and describes the initial state before disengagement. An actuation that triggers the shifting process is illustrated in FIG. 18 by an arrow marked with 578. Here, the actuation 578 thus includes pulling of the first ring 524 away from the secondary side 504 in the direction of the primary side 502.

Figure 23:
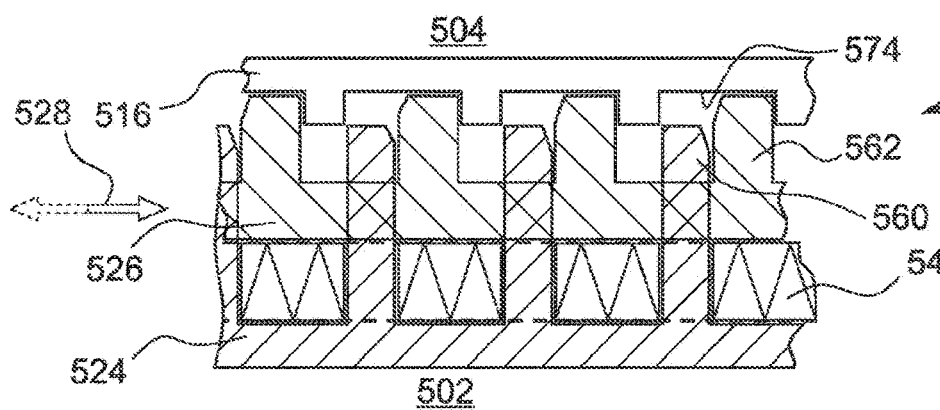

FIG. 23 illustrates that the first ring 524 with the first primary-side driving claws 560 can follow the actuation 578 directly or with a slight delay. The preload element 544 is loaded in tension, at least in exemplary embodiments. Energy can therefore also be stored in the preload element 544 when disengaging. This energy can be used to disengage the second ring 526 with the second driving claws 562 from the driving recesses 574. It is understood that different preload elements (springs) may be provided for storing energy during the engagement movement and storing energy during the disengaging movement.

Figure 24:
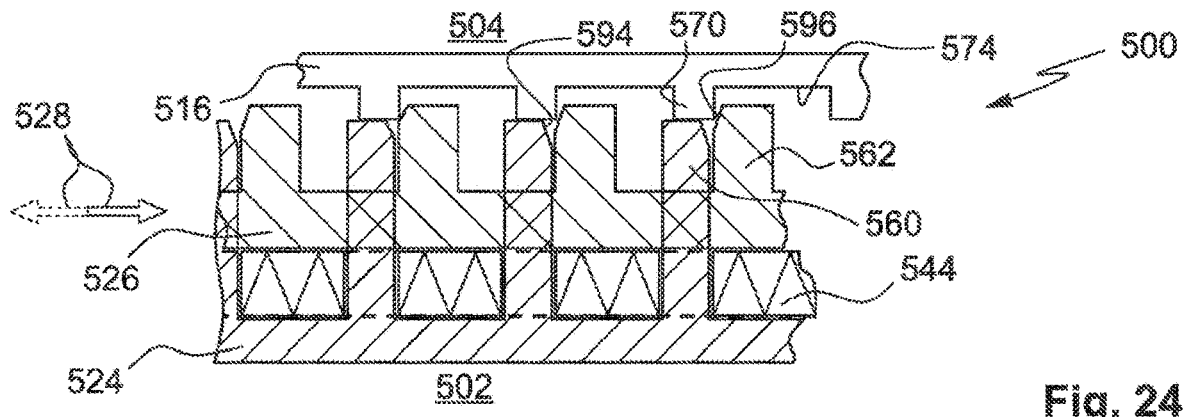
Figure 25:
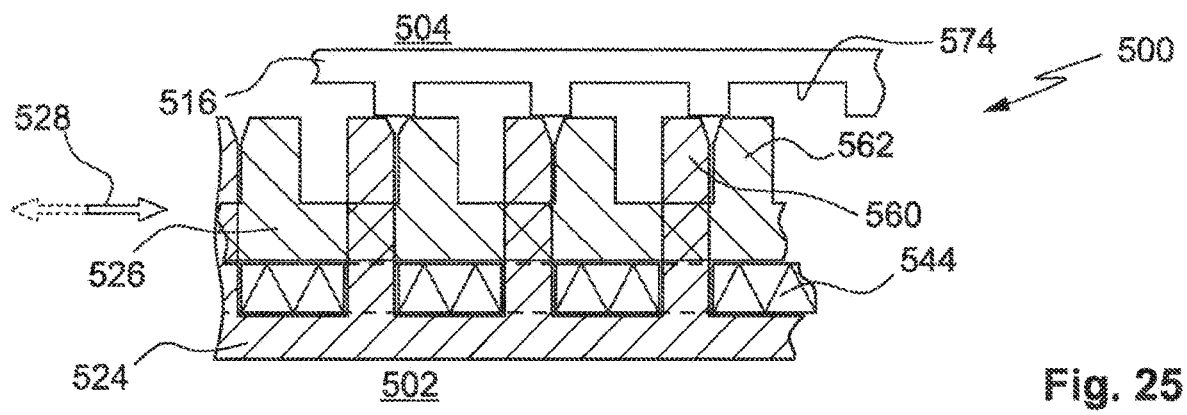

In FIG. 23, the driving claws 560 are completely disengaged from the driving recesses 574. Consequently, some relative rotation between the primary part 502 and the secondary part 504 is possible. FIG. 24 illustrates a state in which the secondary side 504 rotates with higher angular velocity than the primary side 502. Consequently, the second-side driving claws 570 may also contribute to pushing the second primary side driving claws 562 out of the engaged state. Finally, FIG. 25 shows a completely disengaged state of clutch unit 500 which allows arbitrary relative rotations between the primary side 502 and the secondary side 504.

The processes described above for engaging and disengaging the clutch unit 500 can be influenced and controlled by specifically influencing the relative velocities (relative angular velocity) of the primary side 502 and the secondary side 504. This can be done with a suitable drive control (see reference sign 56 in FIG. 1). Therefore, both the engagement sequence according to FIGS. 18-21 and the disengagement sequence according to FIGS. 22-25 is basically conceivable in both directions of rotation, if care is taken accordingly to ensure that suitable speed differences between the primary side 502 and the secondary side 504 result, in order to enable the engagement and disengagement of the driving claws 560, 562.

Again, reference is made to FIG. 19, FIG. 24 and the sequence of FIGS. 18-25 as a whole. FIG. 19 and FIG. 24 illustrate that the first primary-side driving claws 560 are provided with inclined flanks 594, which are inclined with respect to an actuation direction (seen globally axially). In the exemplary embodiment, the second primary-side driving claws 562 also have inclined flanks 596, which are inclined with respect to an actuation direction (seen globally axially).

The flanks 594, 596 are inclined against each other in the exemplary embodiment, so that a V-shaped orientation results in the configuration shown in FIG. 19. See also FIG. 18 and FIG. 21, in which the end faces of the driving claws 560, 562 facing the secondary side 504 essentially assume the same axial position. In the exemplary embodiment, the V has an angle of about 30° to 60°, so that each of the two flanks 594, 596 is inclined by an angle of about 15° to 30° with respect to the (axial) direction of actuation. The orientation of the flanks 594, 596 is otherwise adapted to the orientation of counter-flanks of the secondary-side driving claws, which can contact the flanks 594, 596 if necessary.

The flanks 594, 596 can simplify, on the one hand, the engagement into the driving recesses, i.e., serve as an insertion aid. Furthermore, the flanks 594, 596 can facilitate the disengagement movement, see FIG. 24. In the given relative orientation, the secondary-side driving claws 570 contact the flanks 596 of the second primary-side driving claws 562. If the secondary side 504 rotates at a higher angular velocity than the primary side 502, the inclination of the flanks 596 results in a force component that pushes the second ring 526 against the force of the preload element 544 in the direction of the primary side 502.

It is in principle also conceivable to provide inclined flanks, chamfers, rounds and the like only in one group of the first driving claws 560 and the second driving claws 562. In principle, inclined flanks, chamfers, curves and the like may also be provided in other embodiments of clutch units 100-800 shown herein.

Figure 26:
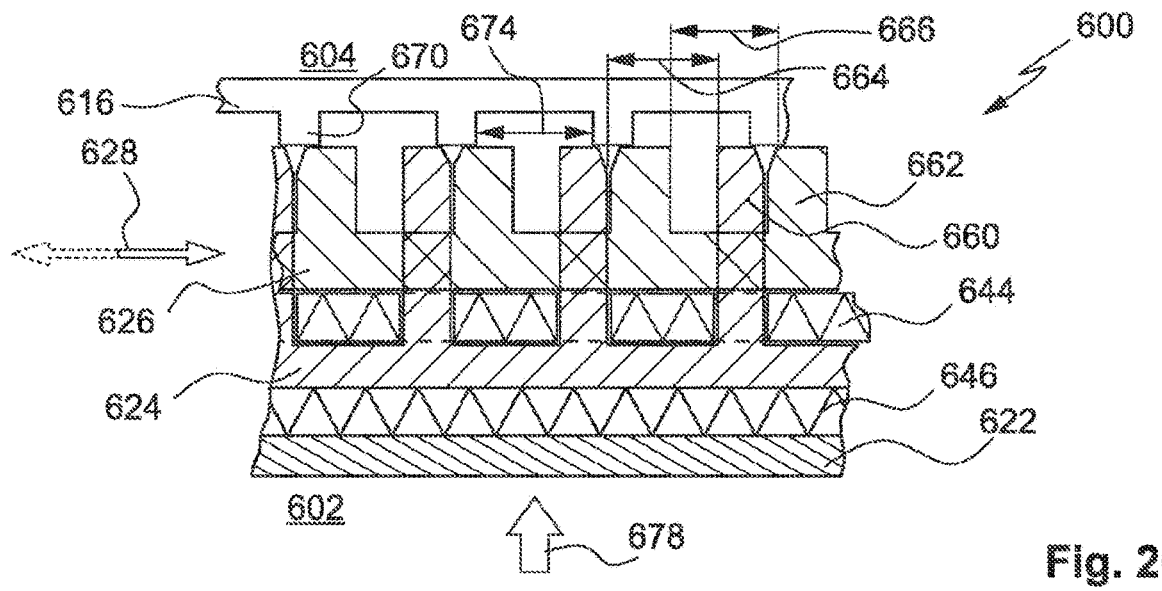
FIG. 26: a further schematically highly simplified partial view for illustrating a further embodiment of a clutch unit.

With reference to FIG. 26, a further embodiment of a switchable clutch unit 600 is illustrated by means of a partial view of an imaginary development. The design shown in FIG. 26 is at least similar to the design of the clutch unit 500 illustrated by FIGS. 18-25, so that differences are primarily discussed below.

The clutch unit 600 has a primary side 602 and a secondary side 604. A driving body 616 is provided on the secondary side 604. A first ring 624 and a second ring 626 are provided on the primary side 602 in a manner already described above. In addition, an actuation ring marked 622 is provided on the primary side 602. An arrow marked 628 illustrates a global direction of rotation of the clutch unit 600. Basically, both directions of rotation (clockwise, counterclockwise) are conceivable.

At least a first preload element 644 is interposed between the first ring 624 and the second ring 626 in a manner that has already been described above. In addition, in the exemplary embodiment, at least a second preload element 646 is arranged between the actuating ring 622 and the first ring 624.

The first ring 624 has first primary-side driving claws 660 and first primary-side driving recesses 664. The second ring 626 has second primary-side driving claws 662 and second primary-side driving recesses 666. The driving body 616 on the secondary side 604 has first (single) driving claws 670 and first (single) driving recesses 674. The driving claws 660, 670 are provided with inclined chamfers, at least in exemplary embodiments.

The clutch unit 600 is shown in FIG. 26 in a decoupled/disengaged position. An actuation pulse for shifting the clutch unit 600 is indicated by an arrow marked with 678. In the position shown in FIG. 26, engagement of the first primary-side driving claws 660 into the secondary-side driving recess 674 is just not possible, because the first primary side driving claws 660 are prevented from doing so by the secondary-side driving claws 670. The driving claws 660, 670 would contact each other on the front side if necessary.

The shifting of the clutch unit 600 is simplified in that an actuating energy introduced by a possible actuator (compare the actuator 90 in FIG. 3) can be stored by at least one preload element 646. The actuation energy can be released when the relative orientation between the primary side 602 and the secondary side 604 allows the first primary side driving claws 660 to engage.

Figure 27:
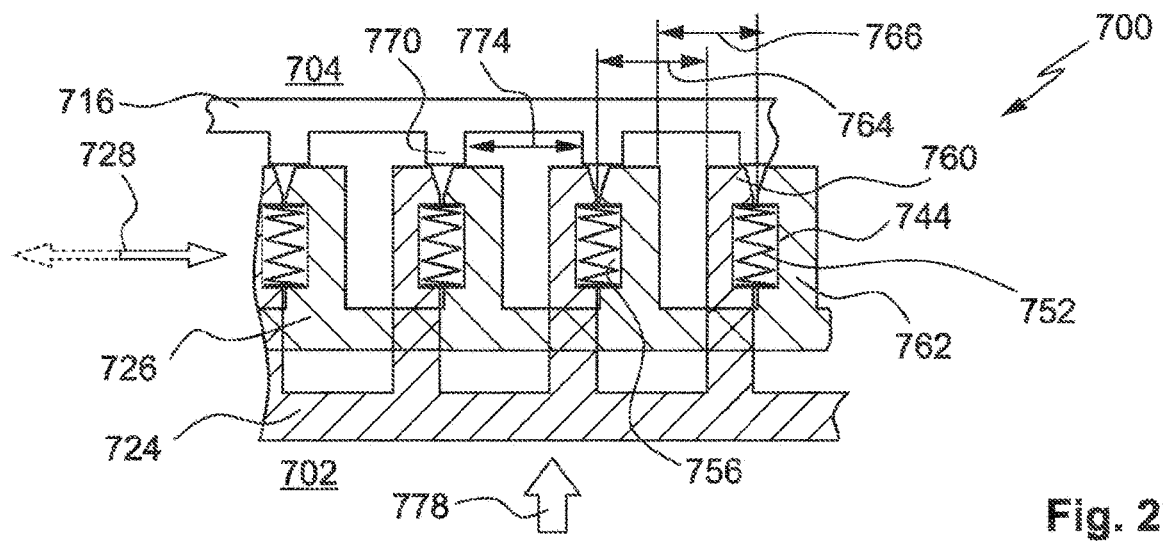
FIG. 27: a further schematically highly simplified partial view for illustrating a further embodiment of a clutch unit.

With reference to FIG. 27, a partial view of an imaginary development of an exemplary embodiment of a switchable clutch unit 700 is illustrated. The design shown in FIG. 27 is at least similar to the design of the previously illustrated clutch units 100-600, so that differences are primarily discussed below.

The clutch unit 700 has a primary side 702 and a secondary side 704. A driving body 716 is provided on the secondary side 704. On the primary side 702, a first ring 724 and a second ring 726 are provided in a manner already described above. An arrow marked with 728 illustrates a global direction of rotation of the clutch unit 700. Basically, both directions of rotation (clockwise, counterclockwise) are conceivable. At least a first preload element 744 is arranged between the first ring 724 and the second ring 726.

In the exemplary embodiment, the at least one preload element 744 comprises a plural of coil springs 752, which are designed as compression springs, for example. The coil springs 752 are arranged in pockets 756, which are formed by recesses between adjacent driving claws 760, 762 facing one another. Other designs of the at least one preload element 744 are nevertheless conceivable. In the exemplary embodiment, the preload elements 744 are interposed between the first ring 724 and the second ring 726 in such a way that, on the basis of an equilibrium state (orientation in FIG. 27 with regard to their axial position equally positioned first driving claws 760 and second driving claws 762) any relative movement between the first ring 724 and the second ring 726 in the axial direction (direction of actuation) generates a restoring force of the preload elements 744 towards the equilibrium state. In this design, therefore, the desired coupling of the first ring 724 to the second ring 726 can be effected with only one type of preload elements 744 both during engagement and disengagement.

The first ring 724 has first driving claws 760 and first driving recesses 764 on the primary side 702. The second ring 726 has second driving claws 762 and second driving recesses 766 on the primary side 702. The driving body 716 on the secondary side 704 has first (only) driving claws 770 and first (only) driving recesses 774. The driving claws 760, 770 are provided with inclined chamfers, at least in exemplary embodiments. The clutch unit 700 is shown in FIG. 27 in a decoupled/disengaged position. An actuation pulse for shifting the clutch unit 700 is indicated by an arrow marked 778.

Figure 28:
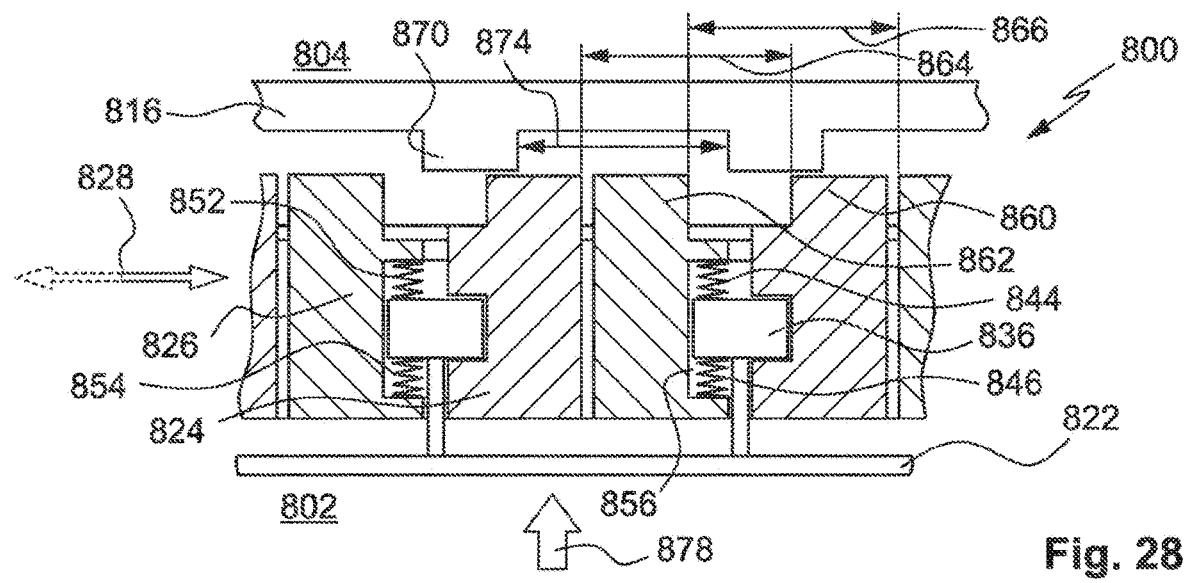
FIG. 28: a further schematically highly simplified partial view for illustrating a further embodiment of a clutch unit.

With reference to FIG. 28, a further embodiment of a switchable clutch unit 800 is illustrated by means of a partial view of an imaginary development. The design shown in FIG. 28 is at least similar to the design of the previously illustrated clutch units 100-700, so that differences are primarily discussed below.

The clutch unit 800 has a primary side 802 and a secondary side 804. A driving body 816 is provided on the secondary side 804. On the primary side 802, a first ring 824 and a second ring 826 are provided in a manner already described above. In addition, an actuating ring designated with 822 is provided on the primary side 802. An arrow marked with 828 illustrates a global direction of rotation of the clutch unit 800. Basically, both directions of rotation (clockwise, counterclockwise) are conceivable. The actuating ring 822 is firmly coupled to at least one actuator 836, which is arranged between the driving claws 860, 862. In the exemplary embodiment, mutually adjacent driving claws 860, 862 have recesses facing one another, which form pockets 856 in which the actuator 836 is arranged.

At least one first preload element 844 and a second preload element 846 are arranged between the first ring 824 and the second ring 826. In the exemplary embodiment, at least one first preload element 844 is designed as a coil spring 852. Similarly, in the exemplary embodiment, at least one second preload element 846 is designed as a helical spring 854 (i.e., a coil spring). Other designs of the preload elements 844, 846 are nevertheless conceivable.

The first ring 824 comprises first primary-side driving claws 860 and first primary-side driving recesses 864. The second ring 826 has second primary-side driving claws 862 and second primary-side driving claws 866. The secondary-sided driving body 816 has first (only) driving claws 870 and these intermediate first (only) driving recesses 874. The clutch unit 800 is shown in FIG. 28 in a decoupled/disengaged position.

In the exemplary embodiment, the preload elements 844, 846 are arranged in the pockets 856 formed by mutually facing recesses between adjacent driving claws 860, 862. Similar to the preload element 744 in the embodiment example according to FIG. 27, the preload elements 844, 846 of the clutch unit 800 according to FIG. 28 push the driving claws 860, 862 and consequently the first ring 824 and the second ring 826 in the direction of a state of equilibrium.

FIG. 28 illustrates the state of equilibrium, in which, for example, the forces of the preload elements 844, 846 cancel each other out. The at least one preload element 844 is arranged between the second driving claws 862 on the primary side 802 and the end of the actuator 836 on the secondary side 804 and pushes them apart. The at least one preload element 846 is arranged between the first driving claws 860 on the primary side 802 and the end of the actuator 836 on the primary side 802 and pushes them apart. In this way, this ensures that the second driving claws 862 one the primary side 802 with the second ring 826 follow the movement of the first ring 824 with the first driving claws 860 when shifting the clutch unit 800. An actuation pulse for shifting the clutch unit 800 is indicated by an arrow marked 878.

The first driving claws 860 and the second driving claws 862 are elastically coupled to each other by the actuators 836 and the preload elements 844, 846. The preload elements 844, 846 can store and release energy. This results in the staggered movement of the driving claws 860, 862. The preload elements 844, 846 support both the engagement movement and the disengagement movement of the second driving claws 862. There is only one actuator (arrow 878) acting from the ring 824 for the required movement of both rings 824, 826. This also applies to further embodiments described herein.

The invention claimed is:

1. A switchable clutch unit for coupling a drive component, in particular a drive component of a vehicle (10) driven by an electric motor or provided with a drive assisted by an electric motor, wherein the clutch unit comprises:
   a primary side (102, 202, 302, 402, 502, 602, 702, 802) and a secondary side (104, 204, 304, 404, 504, 604), which can be positively connected to one another for rotary driving,
   wherein the secondary side (104, 204, 304, 404, 504, 604, 704, 804) has driving recesses (174, 176; 274, 276; 374; 474; 574; 674; 774; 874) distributed around the circumference,
   wherein the primary side (102, 202, 302, 402, 502, 602, 702, 802) has driving claws (160, 162; 260, 262; 360, 362; 460, 462; 560, 562; 660, 662; 760, 762; 860, 862) distributed around the circumference, which are formed for engaging in the driving recesses (174, 176; 274, 276; 374; 474; 574; 674; 774; 874) of the secondary side (104, 204, 304, 404, 504, 604, 704, 804),
   wherein the driving claws (160, 162; 260, 262; 360, 362; 460, 462; 560, 562; 660, 662; 760, 762; 860, 862) comprise a group of first driving claws (160, 260, 360, 460, 560, 660, 760, 860) and a group of second driving claws (162, 262, 362, 462, 562, 662, 762, 862),
   wherein the first driving claws (160, 260, 360, 460, 560, 660, 760, 860) can be moved between an engaged position and an disengaged position with respect to the driving recesses (174, 176; 274, 276; 374; 474; 574; 674; 774; 874),
   wherein the second driving claws (162, 262, 362, 462, 562, 662, 762, 862) are displaceable between an engaged position and an disengaged position with respect to the driving recesses (174, 176; 274, 276; 374; 474; 574; 674; 774; 874),
   wherein the first driving claws (160, 260, 360, 460, 560, 660, 760, 860) and the second driving claws (162, 262, 362, 462, 562, 662, 762, 862) are displaceable relative to one another;
   wherein the first driving claws (160, 260, 360, 460, 560, 660, 760, 860) have a first ring (124, 224, 324, 424, 524, 624, 724, 824) and the second driving claws (162, 262, 362, 462, 562, 662, 762, 862) are associated with a second ring (126, 226, 326, 426, 526, 626, 726, 826); and
   wherein the first ring (124, 224, 324, 424, 524, 624, 724, 824) and the second ring (126, 226, 326, 426, 526, 626, 726, 826) each have a rotary driving contour (130, 132) which interacts with a counter-contour (134) on the primary side for positive rotary driving within the primary side (102, 202, 302, 402, 502, 602, 702, 802).

2. The clutch unit according to claim 1, wherein the first driving claws (160, 260, 360, 460, 560, 660, 760, 860) and the second driving claws (162, 262, 362, 462, 562, 662, 762, 862) are axially displaceable.

3. The clutch unit according to claim 1, wherein the first driving claws (160, 260, 360, 460, 560, 660, 760, 860) and the second driving claws (162, 262, 362, 462, 562, 662, 762, 862) rotate in the open state and closed state of the clutch unit with the primary side (102, 202, 302, 402, 502, 602, 702, 802).

4. The clutch unit according to claim 1, wherein the first ring (124, 224, 324, 424, 524, 624, 724, 824) and the second ring (126, 226, 326, 426, 526, 626, 726, 826) are provided with a rotary driving contour (130, 132) of the same diameter at their circumference, and wherein the rotary driving contours of the first ring (124, 224, 324, 424, 524, 624, 724, 824) and the second ring (126, 226, 326, 426, 526, 626, 726, 826) interact with one and the same counter-contour (134) on the primary side.

5. The clutch unit according to claim 1, wherein at least the first driving claws (160, 260, 360, 460, 560, 660, 760, 860) or the second driving claws (162, 262, 362, 462, 562, 662, 762, 862) radially extend inwards towards a center from the first ring (124, 224, 324, 424, 624, 724, 824) or from the second ring (126, 226, 326, 426, 526, 626, 726, 826).

6. The clutch unit according to claim 1, wherein at least the first driving claws (160, 260, 360, 460, 560, 660, 760, 860) or the second driving claws (162, 262, 362, 462, 562, 662, 762, 862) starting from an end face (380, 480) of the first ring (124, 224, 324, 424, 524, 624, 724, 824) or the second ring (126, 226, 326, 426, 526, 626, 726, 826) extend axially towards the secondary side (104, 204, 304, 404, 504, 604, 704, 804).

7. The clutch unit according to claim 1, wherein raised actuating sections (138, 238, 338, 438) are formed on the first ring (124, 224, 324, 424, 524, 624, 724, 824), which extend axially starting from one end face remote from the secondary side (104, 204, 304, 404, 504, 604, 704, 804).

8. The clutch unit according to claim 1, further comprising a first ring (124, 224, 324, 424, 524, 624, 724, 824) which carries the first driving claws (160, 260, 360, 460, 560, 660, 760, 860), an actuating section (138, 238, 338, 438) on the first ring (124, 224, 324, 424, 524, 624, 724, 824), and an actuator (90), which acts on the actuating section (138, 238, 338, 438) to move the first driving claws (160, 260, 360, 460, 560, 660, 760, 860) between the engaged position and the disengaged position in relation to the driving recesses (174, 176; 274, 276; 374; 474; 574; 674; 774; 874) to shift, the first driving claws (160, 260, 360, 460, 560, 660, 760, 860) and the second driving claws (162, 262, 362, 462, 562, 662, 762, 862) are coupled to one another in such a way that the movement of the first driving claws (160, 260, 360, 460, 560, 660, 760, 860) generates a preload force for the movement of the second driving claws (162, 262, 362, 462, 562, 662, 762, 862) in the same direction.

9. The clutch unit according to claim 8, wherein the actuator (90) acts directly on the first driving claws (160, 260, 360, 460, 560, 660, 760, 860) in order to displace them.

10. The clutch unit according to claim 8, wherein the actuator (90) acts indirectly via a preload element (646) on the first driving claws (160, 260, 360, 460, 560, 660, 760, 860) in order to displace them.

11. The clutch unit according to claim 1, wherein at least one preload element (144, 244, 344, 444, 544, 644, 744, 844) is assigned to the first driving claws (160, 260, 360, 460, 560, 660, 760, 860) and the second driving claws (162, 262, 362, 462, 562, 662, 762, 862).

12. The clutch unit according to claim 11, wherein the at least one preload element (144, 244, 344, 444, 544, 644, 744, 844) is interposed between the first driving claws (160, 260, 360, 460, 560, 660, 760, 860) and the second driving claws (162, 262, 362, 462, 562, 662, 762, 862) and in an axial relative movement between the first driving claws (160, 260, 360, 460, 560, 660, 760, 860) and the second driving claws (162, 262, 362, 462, 562, 662, 762, 862).

13. The clutch unit according to claim 11, wherein the at least one preload element (144, 244, 344, 444, 544, 644, 744, 844) is designed as a spring or a spring assembly and comprises at least one disc spring (156) or corrugated spring (152).

14. The clutch unit according to claim 11, wherein at least one further preload element (246, 346, 446) is arranged on the side of the first driving claws (160, 260, 360, 460, 560, 660, 760, 860) facing away from the secondary side (104, 204, 304, 404, 504, 604, 704, 804).

15. The clutch unit according to claim 1, wherein the driving claws (160, 162; 260, 262; 360, 362; 460, 462; 560, 562; 660, 662; 760, 762; 860, 862) at least partly in the area of their secondary side (104, 204, 304, 404, 504, 604, 704, 804) have flanks (594, 596) in their the end sections facing the secondary side (104, 204, 304, 404, 504, 604, 704, 804), which are inclined against a respective actuating direction of the driving claws (160, 162; 260, 262; 360, 362; 460, 462; 560, 562; 660, 662; 760, 762; 860, 862).

16. The clutch unit according to claim 15, wherein in the case of adjacent driving claws (160, 162; 260, 262; 360, 362; 460, 462; 560, 562; 660, 662; 760, 762; 860, 862), each of which forms a pair, the end sections of the driving claws (160, 162; 260, 262; 360, 362; 460, 462; 560, 562; 660, 662; 760, 762; 860, 862) of the pair in the area of their secondary side (104, 204, 304, 404, 504, 604, 704, 804) have flanks facing each other (594, 596), which are inclined opposite to a respective actuating direction of the driving claws (160, 162; 260, 262; 360, 362; 460, 462; 560, 562; 660, 662; 760, 762; 860, 862).

17. A switchable clutch unit for coupling a drive component, in particular a drive component of a vehicle (10) driven by an electric motor or provided with a drive assisted by an electric motor, wherein the clutch unit comprises:
   a primary side (102, 202, 302, 402, 502, 602, 702, 802) and a secondary side (104, 204, 304, 404, 504, 604), which can be positively connected to one another for rotary driving,
   wherein the secondary side (104, 204, 304, 404, 504, 604, 704, 804) has driving recesses (174, 176; 274, 276; 374; 474; 574; 674; 774; 874) distributed around the circumference,
   wherein the primary side (102, 202, 302, 402, 502, 602, 702, 802) has driving claws (160, 162; 260, 262; 360, 362; 460, 462; 560, 562; 660, 662; 760, 762; 860, 862) distributed around the circumference, which are formed for engaging in the driving recesses (174, 176; 274, 276; 374; 474; 574; 674; 774; 874) of the secondary side (104, 204, 304, 404, 504, 604, 704, 804),
   wherein the driving claws (160, 162; 260, 262; 360, 362; 460, 462; 560, 562; 660, 662; 760, 762; 860, 862) comprise a group of first driving claws (160, 260, 360, 460, 560, 660, 760, 860) and a group of second driving claws (162, 262, 362, 462, 562, 662, 762, 862),
   wherein the first driving claws (160, 260, 360, 460, 560, 660, 760, 860) can be moved between an engaged position and an disengaged position with respect to the driving recesses (174, 176; 274, 276; 374; 474; 574; 674; 774; 874),
   wherein the second driving claws (162, 262, 362, 462, 562, 662, 762, 862) are displaceable between an engaged position and an disengaged position with respect to the driving recesses (174, 176; 274, 276; 374; 474; 574; 674; 774; 874),
   wherein the first driving claws (160, 260, 360, 460, 560, 660, 760, 860) and the second driving claws (162, 262, 362, 462, 562, 662, 762, 862) are displaceable relative to one another;
   wherein the group of the first driving claws (160, 260, 360, 460, 560, 660, 760, 860) and the group of the second driving claws (162, 262, 362, 462, 562, 662, 762, 862) are coupled in the engaged position to a secondary-side driving body (116, 216, 316, 416) on which the driving recesses (174, 176; 274, 276; 374; 474; 574; 674; 774; 874) are arranged;
   wherein the group of the first driving claws (160, 260, 360, 460, 560, 660, 760, 860) fits into a group of first driving recesses (174, 274) on the secondary-side driving body (116, 216, 316, 416) when engaged, and wherein the group of the second driving claws (162, 262, 362, 462, 562, 662, 762, 862) fits into a group of second driving recesses (176, 276) on the driving body when engaged;
   wherein the first driving recesses (174, 274) are arranged on an end face (184) of the secondary-side driving body (116, 216, 316, 416), and wherein the second driving recesses (176, 276) are arranged on a peripheral section (186) of the driving body (116, 216, 316, 416).

18. The clutch unit according to claim 17, wherein the torque transmission is between the primary side (102, 202, 302, 402, 502, 602, 702, 802) and the secondary side (104, 204, 304, 404, 504, 604, 704, 804) in the engaged state in a first direction of rotation (290) via the first driving claws (160, 260, 360, 460, 560, 660, 760, 860) and in a second direction of rotation (292) via the second driving claws (162, 262, 362, 462, 562, 662, 762, 862).

19. The clutch unit according to claim 17, wherein the torque transmission is between the primary side (102, 202, 302, 402, 502, 602, 702, 802) and the secondary side (104, 204, 304, 404, 504, 604, 704, 804) in the engaged state in a first direction of rotation (190) and in a second direction of rotation (192) via a similar group of driving claws (160, 162; 260, 262; 360, 362; 460, 462; 560, 562; 660, 662; 760, 762; 860, 862), wherein the torque transmission takes place via flanks of the driving claws (160, 162; 260, 262; 360, 362; 460, 462; 560, 562; 660, 662; 760, 762; 860, 862).

20. The clutch unit according to claim 17, wherein the group of the first driving claws (160, 260, 360, 460, 560, 660, 760, 860) and the group of the second driving claws (162, 262, 362, 462, 562, 662, 762, 862) engage into a single group of driving recesses (374, 474, 574, 674, 774, 874).

21. The clutch unit according to claim 20, wherein the driving recesses (374, 474, 574, 674, 774, 874) are arranged on an end face (384) or cone surface (484) of the secondary-side driving body (116, 216, 316, 416).

22. The clutch unit according to claim 20, wherein at least two adjacent driving claws (160, 162; 260, 262; 360, 362; 460, 462; 560, 562; 660, 662; 760, 762; 860, 862), of which one belonging to the group of the first driving claws (160, 260, 360, 460, 560, 660, 760, 860) and the other belonging to the group of second driving claws (162, 262, 362, 462, 562, 662, 762, 862), form a pair and, in the engaged state, can be positioned together in a driving recess (374, 474, 574, 674, 774, 874) on the secondary side (104, 204, 304, 404, 504, 604, 704, 804).

23. A switchable clutch unit for coupling a drive component, in particular a drive component of a vehicle (10) driven by an electric motor or provided with a drive assisted by an electric motor, wherein the clutch unit comprises:
   a primary side (102, 202, 302, 402, 502, 602, 702, 802) and a secondary side (104, 204, 304, 404, 504, 604), which can be positively connected to one another for rotary driving, wherein the secondary side (104, 204, 304, 404, 504, 604, 704, 804) has driving recesses (174, 176; 274, 276; 374; 474; 574; 674; 774; 874) distributed around the circumference, wherein the primary side (102, 202, 302, 402, 502, 602, 702, 802) has driving claws (160, 162; 260, 262; 360, 362; 460, 462; 560, 562; 660, 662; 760, 762; 860, 862) distributed around the circumference, which are formed for engaging in the driving recesses (174, 176; 274, 276; 374; 474; 574; 674; 774; 874) of the secondary side (104, 204, 304, 404, 504, 604, 704, 804), wherein the driving claws (160, 162; 260, 262; 360, 362; 460, 462; 560, 562; 660, 662; 760, 762; 860, 862) comprise a group of first driving claws (160, 260, 360, 460, 560, 660, 760, 860) and a group of second driving claws (162, 262, 362, 462, 562, 662, 762, 862), wherein the first driving claws (160, 260, 360, 460, 560, 660, 760, 860) can be moved between an engaged position and an disengaged position with respect to the driving recesses (174, 176; 274, 276; 374; 474; 574; 674; 774; 874), wherein the second driving claws (162, 262, 362, 462, 562, 662, 762, 862) are displaceable between an engaged position and an disengaged position with respect to the driving recesses (174, 176; 274, 276; 374; 474; 574; 674; 774; 874), wherein the first driving claws (160, 260, 360, 460, 560, 660, 760, 860) and the second driving claws (162, 262, 362, 462, 562, 662, 762, 862) are displaceable relative to one another; and wherein the first driving claws (160, 260, 360, 460, 560, 660, 760, 860) and the second driving claws (162, 262, 362, 462, 562, 662, 762, 862) are arranged alternately, wherein the first driving claws (160, 260, 360, 460, 560, 660, 760, 860) are distributed along a first diameter, and wherein the second driving claws (162, 262, 362, 462, 562, 662, 762, 862) are arranged along a second diameter.

* * * * *